(12) United States Patent
Kuwata et al.

(10) Patent No.: US 12,482,495 B2
(45) Date of Patent: Nov. 25, 2025

(54) HEAD DRIVING DEVICE CONFIGURED TO MOVE A HEAD MEMBER RELATIVE TO TAPE AS A RECORDING MEDIUM AND CONFIGURED TO STABLY HOLD THE HEAD MEMBER

(71) Applicant: NHK SPRING CO., LTD., Yokohama (JP)

(72) Inventors: Ryo Kuwata, Yokohama (JP); Gaku Nashimoto, Yokohama (JP); Tatsuhiko Nishida, Yokohama (JP); Mikio Arai, Yokohama (JP); Hiroshi Nakayama, Yokohama (JP); Isamu Kuchiwaki, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 18/640,230

(22) Filed: Apr. 19, 2024

(65) Prior Publication Data

US 2024/0386907 A1 Nov. 21, 2024

(30) Foreign Application Priority Data

May 15, 2023 (JP) .................................. 2023-079844

(51) Int. Cl.
| | |
|---|---|
| *G11B 21/10* | (2006.01) |
| *G11B 5/008* | (2006.01) |
| *G11B 5/48* | (2006.01) |
| *G11B 5/584* | (2006.01) |

(52) U.S. Cl.
CPC ........ *G11B 21/103* (2013.01); *G11B 5/00813* (2013.01); *G11B 5/4893* (2013.01); *G11B 5/584* (2013.01)

(58) Field of Classification Search
None
See application file for complete search history.

(56) References Cited

U.S. PATENT DOCUMENTS

| | | | |
|---|---|---|---|
| 8,035,926 B2 * | 10/2011 | Harper | G11B 5/584 360/291 |
| 10,854,236 B1 * | 12/2020 | Harper et al. | G11B 15/62 |
| 10,957,362 B1 * | 3/2021 | Harper | G11B 5/584 |
| 10,971,184 B1 | 4/2021 | Chew | |
| 10,991,390 B2 | 4/2021 | Kobayashi | |
| 11,393,498 B2 | 7/2022 | Kobayashi | |
| 2021/0074323 A1 * | 3/2021 | Harper | G11B 5/584 |
| 2023/0154490 A1 * | 5/2023 | Hanya et al. | G11B 5/4873 360/294.4 |

FOREIGN PATENT DOCUMENTS

JP 2020129424 A 8/2020

\* cited by examiner

*Primary Examiner* — Craig A. Renner
(74) *Attorney, Agent, or Firm* — Holtz, Holtz & Volek PC

(57) ABSTRACT

A head driving device includes a base member, a head supporting member, a beam member, a piezoelectric unit, and a reinforcement member. The reinforcement member includes a first portion and a second portion. The first portion is arranged between a first end portion in a length direction of a head member and the base member. The second member is arranged between a second end portion in a length direction of the head member and the base member. The reinforcement member allows the head supporting member to move in a direction along a surface of tape and controls the head supporting member from moving in a thickness direction of the head member.

9 Claims, 21 Drawing Sheets

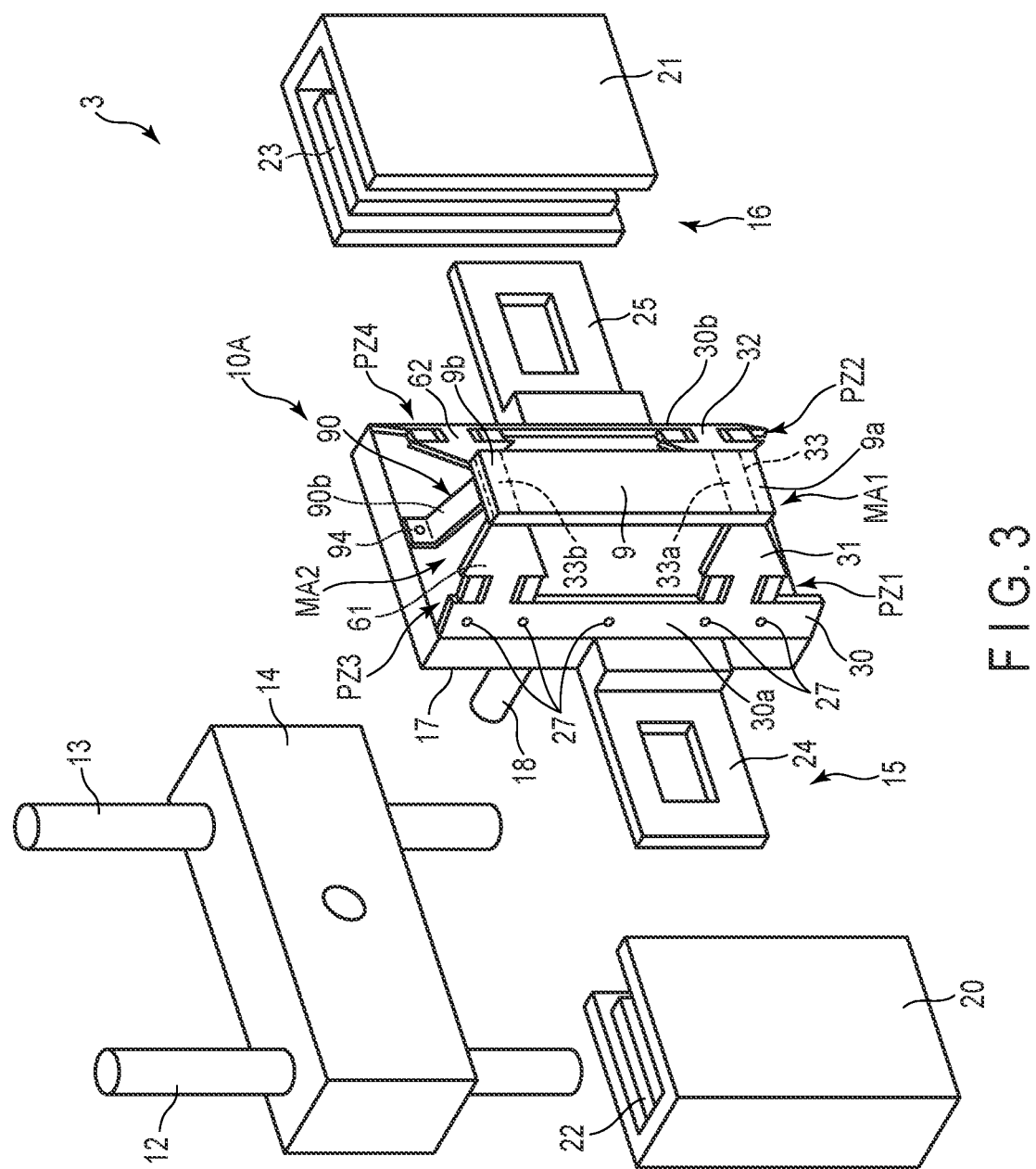
F I G. 3

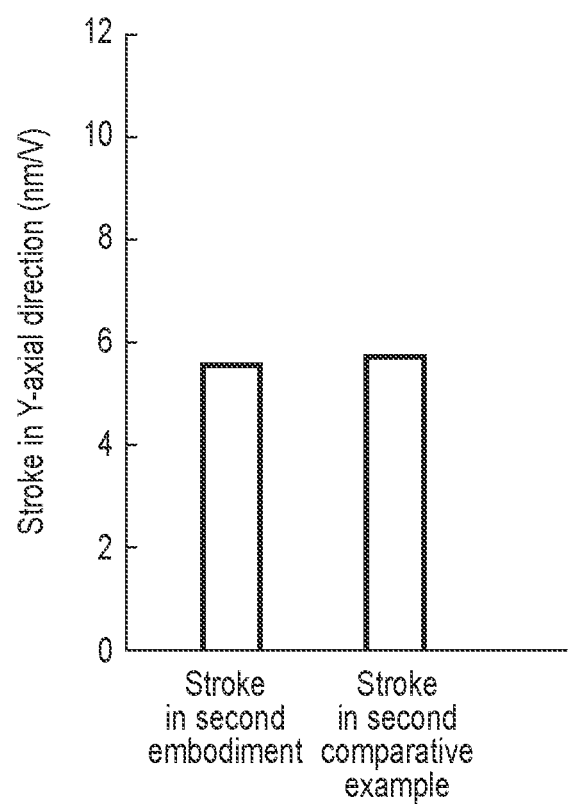
F I G. 13

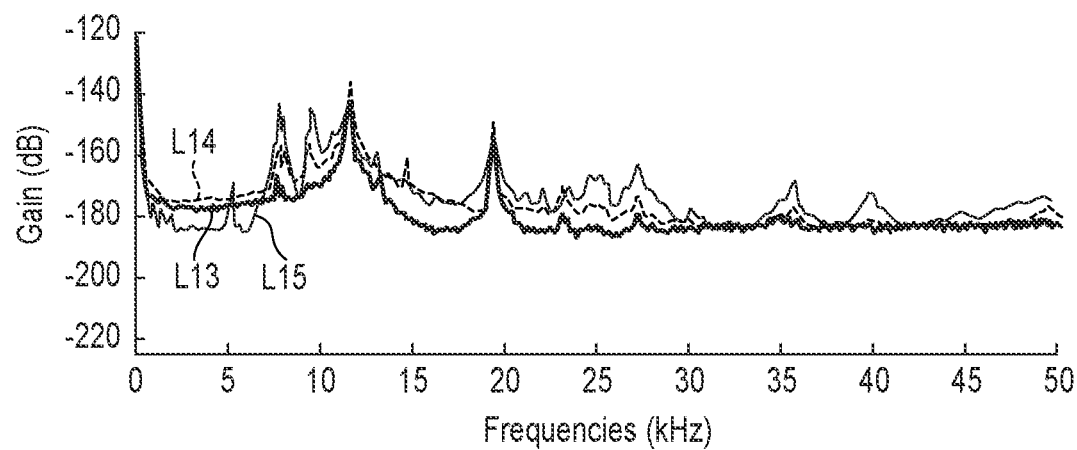
F I G. 16
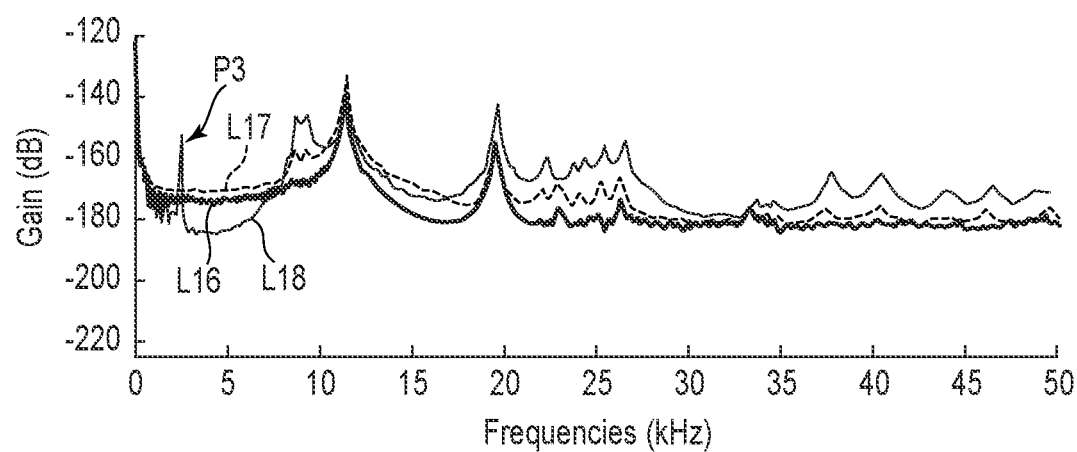
F I G. 17

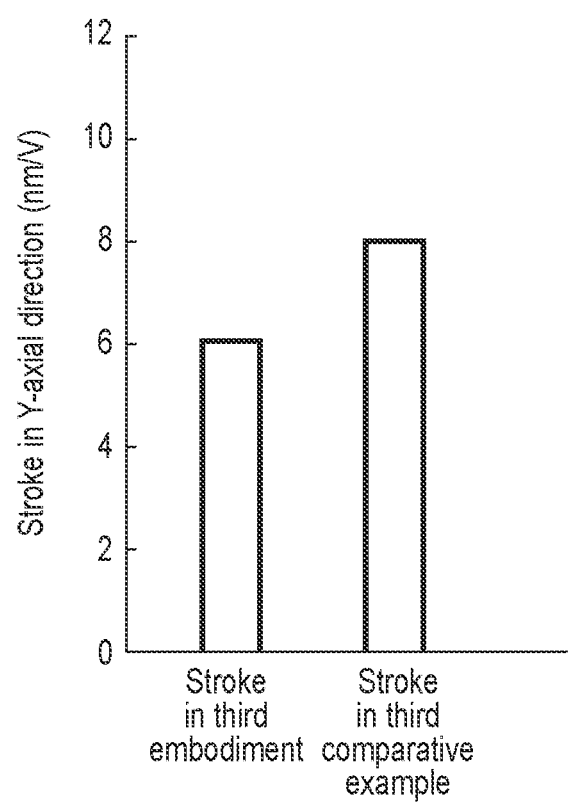
F I G. 18

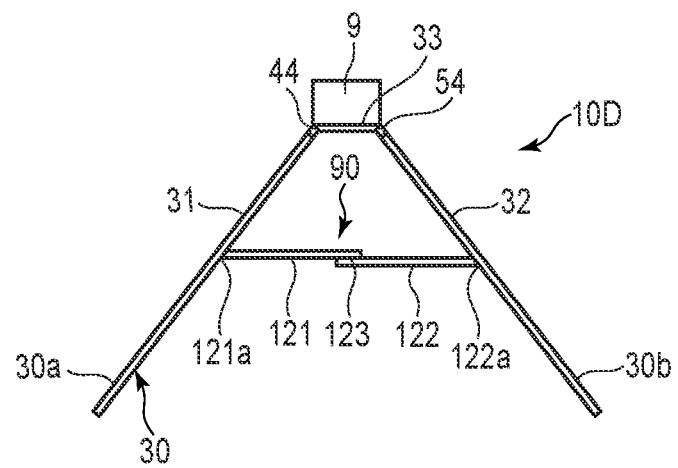
F I G. 19
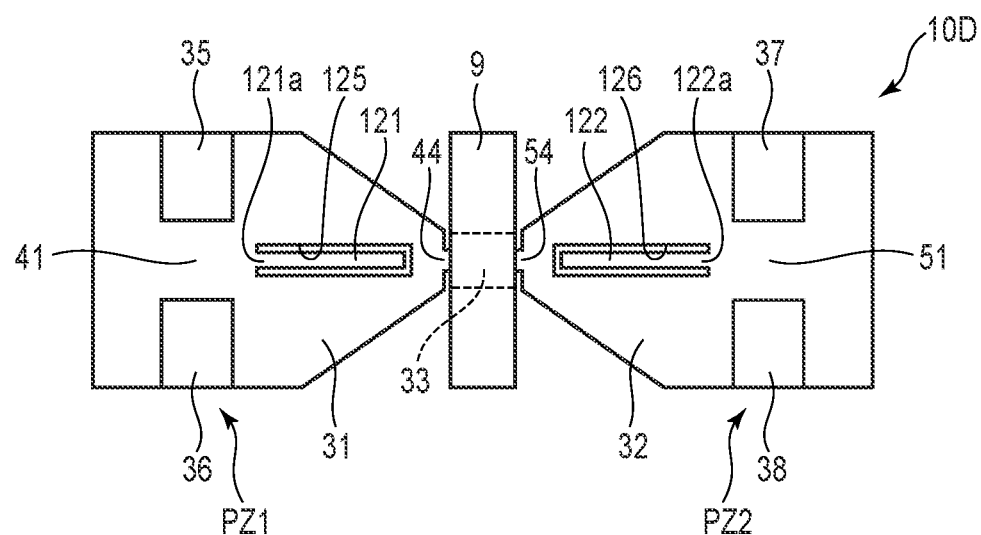
F I G. 20

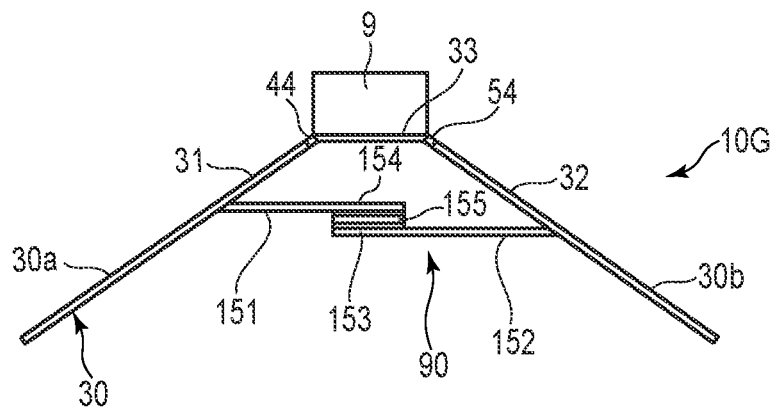
F I G. 25
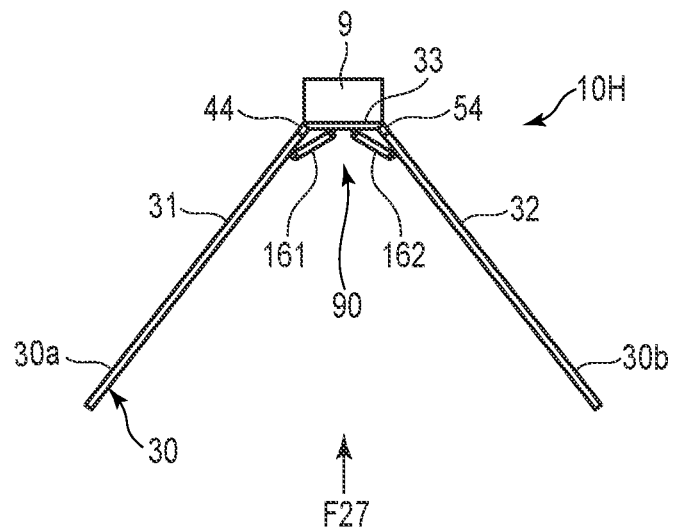
F I G. 26

HEAD DRIVING DEVICE CONFIGURED TO MOVE A HEAD MEMBER RELATIVE TO TAPE AS A RECORDING MEDIUM AND CONFIGURED TO STABLY HOLD THE HEAD MEMBER

CROSS-REFERENCE TO RELATED APPLICATIONS

This application is based upon and claims the benefit of priority from prior Japanese Patent Application No. 2023-079844, filed May 15, 2023, the entire contents of which are incorporated herein by reference.

BACKGROUND OF THE INVENTION

1. Field of the Invention

The present invention relates to a head driving device of a data storage device using tape as a recording medium.

2. Description of the Related Art

Data storage devices which use tape (magnetic tape) as a recording medium are known. Examples of data storage devices are described in U.S. Pat. No. 10,971,184 B (Patent Literature 1) and JP 2020-129424 A (Patent Literature 2). Conventional data storage devices comprise a case, tape accommodated in the case, a tape winding mechanism, a head assembly, and the like. Data is magnetically recorded in the tape. The head assembly includes a magnetic head, a head driving device which relatively moves the magnetic head with respect to the tape, and the like. The magnetic head includes elements for performing access such as reading of data recorded in the tape and wiring of data.

The head driving device of the data storage device described in Patent Literature 1 includes a head stack assembly and a voice coil motor for moving the head stack assembly. A head arm including a spring function is provided at the distal end of the head stack assembly. A magnetic head is mounted on the head arm. The magnetic head moves in the width direction of the tape by the voice coil motor.

The head driving device of the data storage device described in Patent Literature 2 includes a coarse motion actuator and a micromotion actuator to handle the increase in the recording density of tape. The coarse motion actuator moves the magnetic head with a stroke which is relatively large. The micromotion actuator moves the magnetic head with a stroke which is relatively small. A stepping motor or a voice coil motor (VCM) is used for the coarse motion actuator. A piezoelectric element such as lead zirconate titanate (PZT) may be used for the micromotion actuator.

In the head driving device of Patent Literature 1, a small magnetic head moves in the width direction of the tape by the voice coil motor. In this type of conventional device, the tape may be damaged by contact with the magnetic head. In addition, in the conventional device, it is not easy to stably hold the magnetic head in a predetermined position with respect to the tape which moves at high speed. In another conventional device, a large magnetic head having a length corresponding to the width of tape may be used. However, the large magnetic head is heavy. Thus, it is difficult to stably support the magnetic head by a head arm having a suspension function.

The head driving device of Patent Literature 2 comprises the coarse actuator consisting of a voice coil motor, and the micromotion actuator consisting of a piezoelectric element. This type of conventional device has some problems. For example, the structure is complicated, and the number of components is increased.

In the case of hard disk drives using a disk as a recording medium, an air bearing is formed between the surface of the disk and a magnetic head. In the head driving device of Patent Literature 2, tape is used as a recording medium. The head driving device of Patent Literature 2 has the configuration in which the tape is not in contact with the magnetic head, in order to prevent the damage of the tape when the tape is fast wound or fast rewound. However, in this conventional device, the structure of the head driving device is further complicated.

In order to prevent the structure of the head driving device from being complicated, the inventors of the present application has conceived to support the magnetic head by a plurality of beam members on which piezoelectric elements are mounted. In this head driving device, the magnetic head is moved by driving the beam member with the piezoelectric elements. However, by only supporting the magnetic head by the beam members, the magnetic head shows unstable behaviors during running tapes in some cases, and thus a vibration property has room for improvement.

An object of one embodiment is to provide a head driving device which can stably hold a head member and has the improved vibration property.

BRIEF SUMMARY OF THE INVENTION

One embodiment relates to a head driving device moving a head member relative to tape as a recording medium. This head driving device comprises a base member, a head supporting member supporting the head member, a first beam member, a second beam member, a first piezoelectric unit, a second piezoelectric unit, and a reinforcement member. The reinforcement member enables the head supporting member to move in a direction along a surface of the tape (tape track direction) and prevents the head supporting member from moving in a thickness direction of the head member.

The base member includes a first frame portion and a second frame portion. The first beam member is arranged between the first frame portion and the head supporting member. The first beam member includes a first base portion connected to the first frame portion and a first head side hinge portion connected to the head supporting member. The second beam member is arranged on a side opposite to the first beam member with the head supporting member interposed therebetween. The second beam member includes a second base portion connected to the second frame portion and a second head side hinge portion connected to the head supporting member.

The first piezoelectric unit is arranged on the first beam member. The first piezoelectric unit comprises a piezoelectric element. When being applied with a voltage, the piezoelectric element moves the head supporting member in the direction along the surface of the tape. The second piezoelectric unit is arranged on the second beam member. The second piezoelectric unit comprises a piezoelectric element. When being applied with a voltage, the piezoelectric element moves the head supporting member in the direction along the surface of the tape.

The head driving device of the present embodiment can stably hold the head member vibrated by the piezoelectric element and improve the vibration property.

The reinforcement member may include a first member and a second member. The first member is arranged between a first end portion of the head member in a length direction and the base member. The second member is arranged between a second end portion of the head member in the length direction and the base member.

As an example, the reinforcement member is a plate arranged between the first beam member and the second beam member. This plate is arranged laterally along the head supporting member. This plate includes a first end portion connected to the first beam member and a second end portion connected to the second beam member.

Another example of the reinforcement member is a plate arranged between the first beam member and the second beam member. This plate is arranged in a vertical direction orthogonal to the head supporting member. This plate includes a first end portion connected to the first beam member and a second end portion connected to the second beam member.

The reinforcement member may include a first extending portion, a second extending portion, and a connection portion. The first extending portion extends from the first beam member to the second beam member. The second extending portion extends from the second beam member to the first beam member. The connection portion connects the first extending portion with the second extending portion.

The first extending portion may be a part of the first beam member. The second extending portion may be a part of the second beam member.

The connection portion may include a damper member provided between the first extending portion and the second extending portion.

The head driving device may further include a third beam member, a fourth beam member, a third piezoelectric unit, and a fourth piezoelectric unit.

The first frame portion, the first beam member, and the third beam member may be formed of an integral metal plate. The second frame portion, the second beam member, and the fourth beam member may be formed of an integral metal plate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is an exploded perspective view showing the driving assembly shown in FIG. 2.

FIG. 13 is a diagram showing a stroke in a case where the head driving device of the second embodiment is vibrated and a stroke in a case where the head driving device of the comparative example 2 is vibrated.

FIG. 16 is a diagram showing a vibration property of the head driving device of the third embodiment.

FIG. 17 is a diagram showing a vibration property of a head driving device of a comparative example 3.

FIG. 18 is a diagram showing a stroke in a case where the head driving device of the third embodiment is vibrated and a stroke in a case where the head driving device of the comparative example 3 is vibrated.

FIG. 19 is a front view of a head driving device of a fourth embodiment.

FIG. 20 is a developed plan view showing a first beam member and a second beam member of the head driving device shown in FIG. 19.

FIG. 25 is a front view of a head driving device of a seventh embodiment.

FIG. 26 is a front view of a head driving device of an eighth embodiment.

DETAILED DESCRIPTION OF THE INVENTION

[First Embodiment] (FIG. 1 to FIG. 6)

This specification hereinafter describes an example of a data storage device comprising a head driving device 10A according to a first embodiment with reference to FIG. 1 to FIG. 6. A data storage device is not limited to an example shown in FIG. 1 and can be structured in various modes depending on the need.

Figure 1:
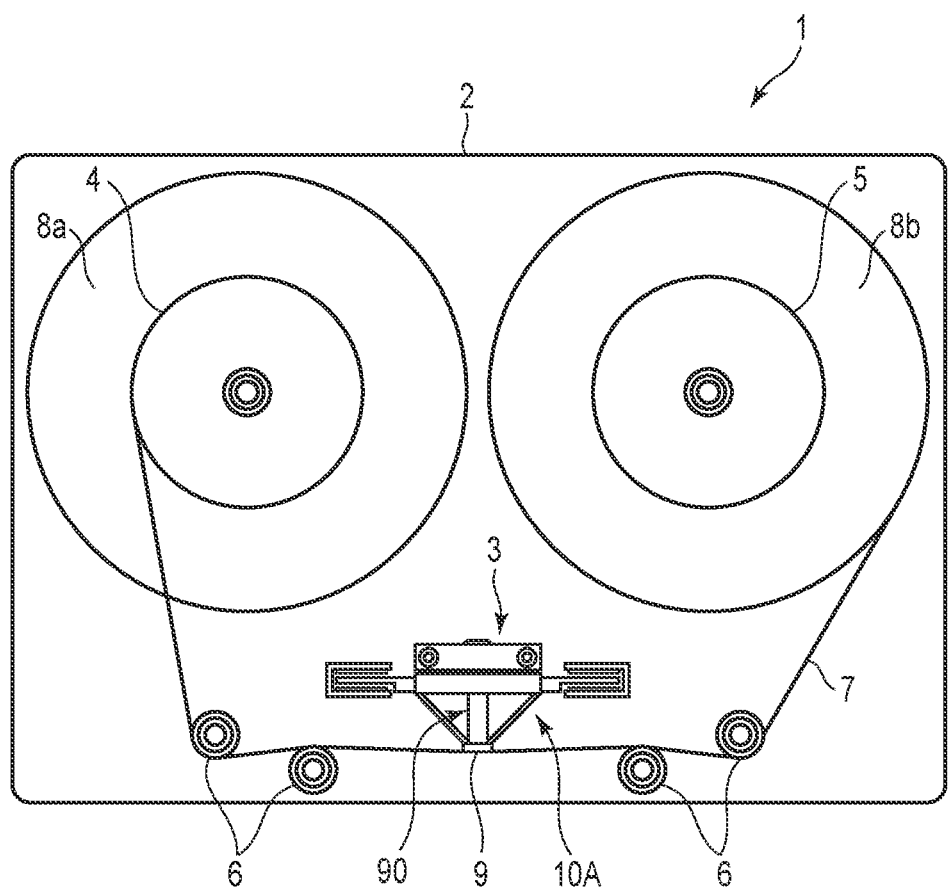
FIG. 1 is a front view schematically showing a data storage device comprising a head driving device according to a first embodiment.

FIG. 1 is a front view schematically showing a data storage device 1 comprising the head driving device 10A. The data storage device 1 includes a case 2, a driving assembly 3, a first winding device 4, a second winding device 5, and a plurality of guide rollers 6. Tape 7 as a recording medium is wound around tape reels 8a and 8b. A head member 9 as a magnetic head is provided on the driving assembly 3.

The driving assembly 3 has a function of moving the head member 9 in the width direction of the tape 7 and a skew direction. The head member 9 extends in the width direction of the tape 7 (shown in FIG. 1). Elements which can convert a magnetic signal into an electric signal such as an MR (Magneto Resistive) element are provided in the head member 9. By these elements, access such as data writing or reading with respect to the tape 7 is performed. The head member 9 may be referred to as a head bar or a slider.

Figure 2:
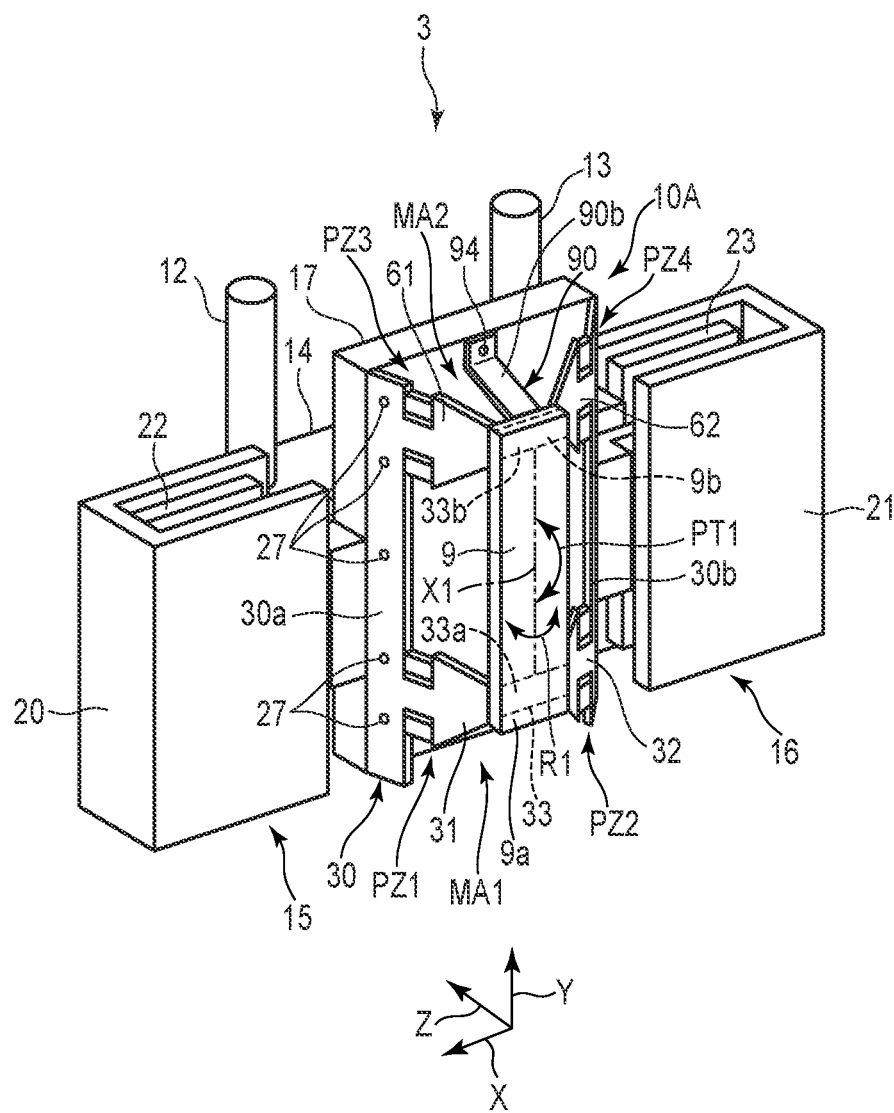
FIG. 2 is a perspective view of a driving assembly of the data storage device shown in FIG. 1.

FIG. 2 shows an example of the driving assembly 3. FIG. 3 is an exploded perspective view showing the driving assembly 3. The driving assembly 3 includes the head driving device 10A. The driving assembly 3 includes a slide member 14, coarse voice coil motors 15 and 16, and a base member 17. The slide member 14 can move along a pair of guide members 12 and 13. The voice coil motors 15 and 16 move the slide member 14. The base member 17 is provided on the slide member 14.

As shown in FIG. 2 and FIG. 3, the head driving device 10A is arranged on the slide member 14. The base member 17 can be pivoted about a skew shaft 18 (shown in FIG. 3). The two-headed arrow PT1 in FIG. 2 shows the pitching direction of the head member 9. The two-headed arrow R1 in FIG. 2 and FIG. 5 shows the rolling direction of the head member 9.

Figure 5:
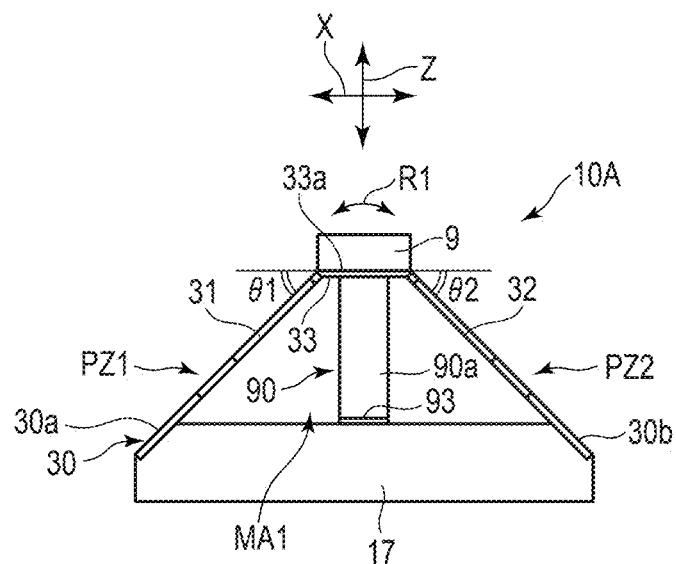
FIG. 5 is a front view in which the head driving device shown in FIG. 4 is viewed in the direction shown by arrow F5 in FIG. 4.

In this specification, for convenience of description, the width direction of the head member 9 is referred to as the X-axial direction (shown in FIG. 2 and FIG. 5). The length direction of the head member 9 is referred to as the Y-axial direction, and the thickness direction of the head member 9 is referred to as the Z-axial direction. The Y-axial direction is also the direction along a surface of the tape 7 (referred to as a tape track direction as well).

The pair of voice coil motors 15 and 16 respectively comprise yokes 20 and 21, magnets 22 and 23, and coils 24 and 25. The voice coil motors 15 and 16 move the slide member 14 and the base member 17 along the guide members 12 and 13. The voice coil motors 15 and 16 rotate the base member 17 and the head driving device 10A around the skew shaft 18.

Figure 4:
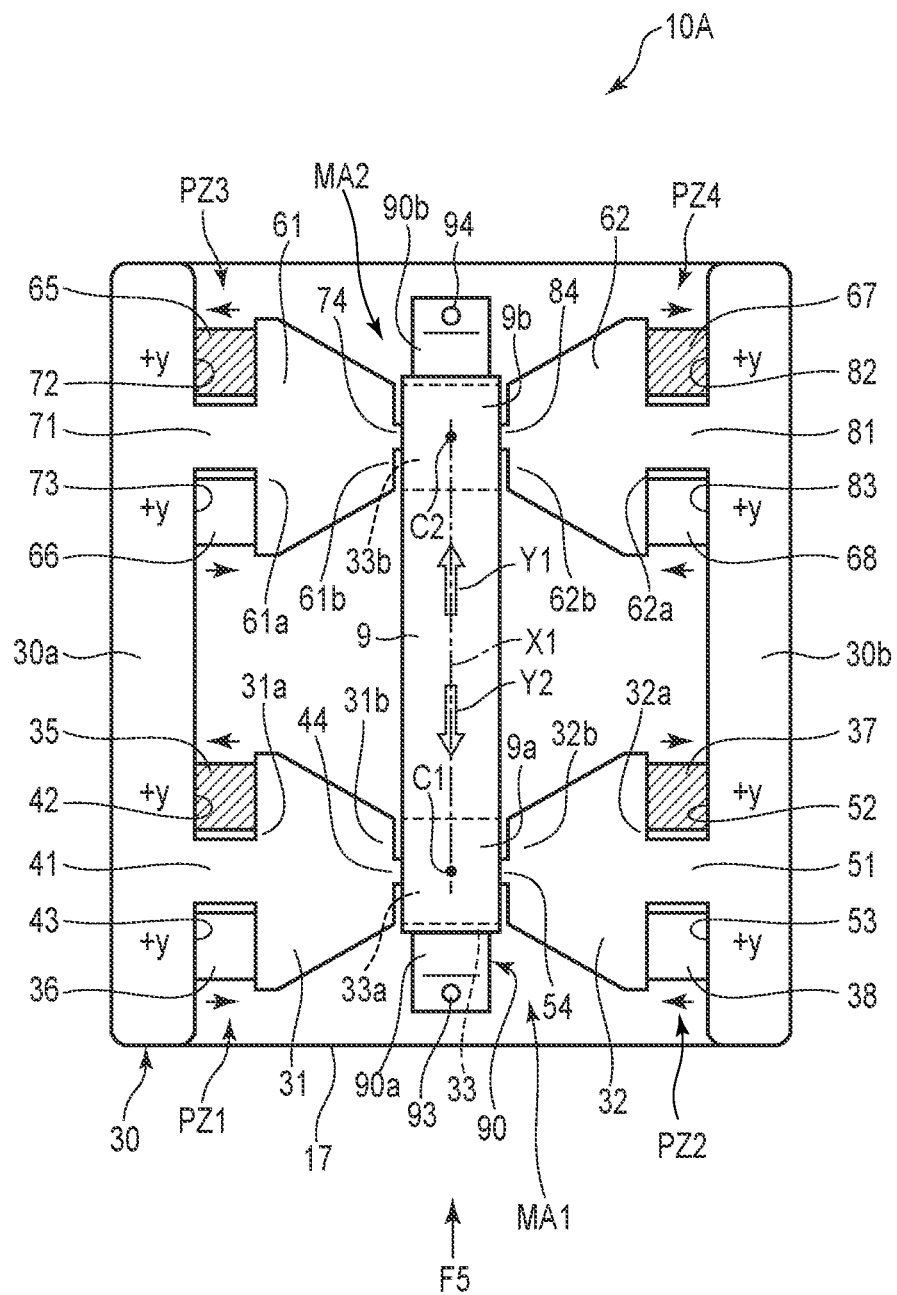
FIG. 4 is a plan view of a head driving device of the driving assembly shown in FIG. 2.

FIG. 4 is a plan view of the head driving device 10A. The head driving device 10A comprises a frame structure 30, a first actuator assembly MA1, and a second actuator assembly MA2. The frame structure 30 constitutes a part of the base member 17. The first actuator assembly MA1 is located on the lower side in FIG. 4. The second actuator assembly MA2 is located on the upper side in FIG. 4. The first actuator assembly MA1 and the second actuator assembly MA2 have substantially common configurations.

The frame structure 30 is a part of the base member 17. The frame structure 30 includes a first frame portion 30a located on the left side in FIG. 4 and a second frame portion 30b on the right side in FIG. 4. The first frame portion 30a and the second frame portion 30b extend in directions parallel to each other. The first frame portion 30a is fixed to a side portion of the base member 17 by a fixing portion 27 (shown in FIG. 2 and FIG. 3) such as a thread member or an adhesive. The second frame portion 30b is fixed to the other side portion of the base member 17 by the same fixing portion.

First, the first actuator assembly MA1 will be described below.

The first actuator assembly MA1 includes a first beam member 31, a second beam member 32, a first portion 33a of a head supporting member 33, and four piezoelectric elements 35, 36, 37, and 38. The Piezoelectric elements 35, 36, 37, and 38 are constituted by piezoelectric bodies have a property of deforming when being applied with a voltage, for example, PZT.

As shown in FIG. 4, the head member 9 includes a first end portion 9a in the length direction and a second end portion 9b in the length direction. Axis X1 of the head member 9 extends in the length direction of the head member 9 through center C1 of the first portion 33a of the head supporting member 33. The first beam member 31 and the second beam member 32 are substantially line-symmetric to each other with respect to axis X1.

The first beam member 31 and the second beam member 32 extend in a direction orthogonal to axis X1. The first portion 33a of the head supporting member 33 supports the first end portion 9a of the head member 9. The first end portion 9a of the head member 9 is fixed to the first portion 33a of the head supporting member 33 by a fixing means such as an adhesive.

The first beam member 31 extends from the first frame portion 30a to the first portion 33a of the head supporting member 33. The second beam member 32 is provided on a side opposite to the first beam member 31 with the first portion 33a of the head supporting member 33 interposed therebetween. The second beam member 32 extends from the second frame portion 30b to the first portion 33a of the head supporting member 33. The first beam member 31 and the second beam member 32 are formed of, for example, a stainless-steel plate.

As shown in FIG. 4, the first beam member 31 has a tapered shape in which the width decreases from a first base portion 31a to a distal end 31b. A first base side hinge portion 41 is formed between the first base portion 31a and the first frame portion 30a. On both sides of the first base side hinge portion 41, a pair of element accommodation portions 42 and 43 consisting of a recess are formed. A first head side hinge portion 44 having a narrowed width is provided between the distal end 31b of the first beam member 31 and the first portion 33a of the head supporting member 33.

The element accommodation portions 42 and 43 are formed between the first frame portion 30a and the first beam member 31. The piezoelectric elements 35 and 36 are accommodated in the element accommodation portions 42 and 43, respectively. The piezoelectric element 35 indicated by the hatching in FIG. 4 is accommodated in the element accommodation portion 42. The piezoelectric element 35 is accommodated in the element accommodation portion 42 with a predetermined polarity so as to expand or contract based on the polarity (plus or minus) of the applied voltage. The piezoelectric element 36 is accommodated in the element accommodation portion 43 such that it faces the opposite direction of the piezoelectric element 35 thereby having the opposite polarity of the piezoelectric element 35.

The piezoelectric elements 35 and 36 provided on the first beam member 31 constitute a first piezoelectric unit PZ1. When the piezoelectric element 35 contracts by the application of a voltage and the piezoelectric element 36 expands, the distal end 31b of the first beam member 31 is displaced in a first direction (shown by arrow Y1 in FIG. 4). When the piezoelectric element 35 expands and the piezoelectric element 36 contracts, the distal end 31b of the first beam member 31 is displaced in a second direction (shown by arrow Y2 in FIG. 4). That is, the first piezoelectric unit PZ1 moves the head supporting member 33 in a direction along the surface of the tape 7 (length direction of the head member 9) in a state where the first piezoelectric unit PZ1 is applied with a voltage.

The second beam member 32 has a tapered shape in which the width decreases from a second base portion 32a to a distal end 32b. A second base side hinge portion 51 is formed between the second base portion 32a and the second frame portion 30b. On both sides of the second base side hinge portion 51, a pair of element accommodation portions 52 and 53 consisting of a recess are formed. A second head side hinge portion 54 having a narrowed width is provided between the distal end 32b of the second beam member 32 and the first portion 33a of the head supporting member 33.

The element accommodation portions 52 and 53 are formed between the second frame portion 30b and the second beam member 32. The piezoelectric elements 37 and 38 are accommodated in the element accommodation portions 52 and 53, respectively. The piezoelectric element 37 indicated by the hatching in FIG. 4 is accommodated in the element accommodation portion 52. The piezoelectric element 37 is accommodated in the element accommodation portion 52 with a predetermined polarity so as to expand or contract based on the polarity (plus or minus) of the applied voltage. The piezoelectric element 38 is accommodated in the element accommodation portion 53 such that it faces the opposite direction of the piezoelectric element 37 thereby having the opposite polarity of the piezoelectric element 37.

The piezoelectric elements 37 and 38 provided on the second beam member 32 constitute a second piezoelectric unit PZ2. When the piezoelectric element 37 contracts by the application of a voltage and the piezoelectric element 38 expands, the distal end 32b of the second beam member 32 is displaced in the first direction (shown by arrow Y1 in FIG. 4). When the piezoelectric element 37 expands by the application of a voltage and the piezoelectric element 38 contracts, the distal end 32b of the second beam member 32 is displaced in the second direction (shown by arrow Y2 in FIG. 4).

That is, the second piezoelectric unit PZ2 moves the head supporting member 33 in a direction along the surface of the tape 7 (length direction of the head member 9) in a state where the second piezoelectric unit PZ2 is applied with a voltage. The head member 9 moves in the tape track direction (first direction Y1 or second direction Y2) by the second beam member 32 displacing in the same direction as that of the first beam member 31.

FIG. 5 is a front view in which the head driving device 10A is viewed in the direction shown by arrow F5 in FIG. 4. The first beam member 31 is bent with respect to the first portion 33a of the head supporting member 33 at an angle θ1 smaller than 90° (for example, 45°). The second beam member 32 is bent with respect to the first portion 33a of the head supporting member 33 at an angle θ2 smaller than 90° (for example, 45°).

Next, the second actuator assembly MA2 will be described below.

The second actuator assembly MA2 includes a third beam member 61 located on the left side in FIG. 4 and a fourth beam member 62 located on the right side in FIG. 4. This actuator assembly MA2 includes a second portion 33b of the head supporting member 33 and four piezoelectric elements 65, 66, 67, and 68. The piezoelectric elements 65, 66, 67, and 68 are constituted by piezoelectric bodies have a property of deforming when being applied with a voltage, for example, PZT.

As shown in FIG. 4, a third beam member 61 and a fourth beam member 62 are substantially line-symmetric to each other. The second end portion 33b of the head supporting member 33 supports the second end portion 9b of the head member 9. The second end portion 9b of the head member 9 is fixed to the second portion 33b of the head supporting member 33 by a fixing means such as an adhesive.

The third beam member 61 extends from the first frame portion 30a to the second portion 33b of the head supporting member 33. The fourth beam member 62 is provided on a side opposite to the third beam member 61 with the second portion 33b of the head supporting member 33 interposed therebetween. The fourth beam member 62 extends from the second frame portion 30b to the second portion 33b of the head supporting member 33. The third beam member 61 and the fourth beam member 62 are formed of, for example, a stainless-steel plate. Axis X1 of the head member 9 passes through center C2 (shown in FIG. 4) of the second portion 33b of the head supporting member 33.

As shown in FIG. 4, the third beam member 61 has a tapered shape in which the width decreases from a third base portion 61a to a distal end 61b. A third base side hinge portion 71 is formed between the third base portion 61a and the first frame portion 30a. On both sides of the third base side hinge portion 71, a pair of element accommodation portions 72 and 73 consisting of a recess are formed. A third head side hinge portion 74 having a narrowed width is provided between the distal end 61b of the third beam member 61 and the second portion 33b of the head supporting member 33.

The element accommodation portions 72 and 73 are formed between the first frame portion 30a and the third beam member 61. The piezoelectric elements 65 and 66 are accommodated in the element accommodation portions 72 and 73, respectively. The piezoelectric element 65 indicated by the hatching in FIG. 4 is accommodated in the element accommodation portion 72. The piezoelectric element 65 is accommodated in the element accommodation portion 72 with a predetermined polarity so as to expand or contract based on the polarity of the applied voltage. The piezoelectric element 66 is accommodated in the element accommodation portion 73 such that it faces the opposite direction of the piezoelectric element 65 thereby having the opposite polarity of the piezoelectric element 65.

The piezoelectric elements 65 and 66 provided on the third beam member 61 constitute a third piezoelectric unit PZ3. When the piezoelectric element 65 contracts by the application of a voltage and the piezoelectric element 66 expands, the distal end 61*b* of the third beam member 61 is displaced in the first direction (shown by arrow Y1 in FIG. 4). When the piezoelectric element 65 expands by the application of a voltage and the piezoelectric element 66 contracts, the distal end 61*b* of the third beam member 61 is displaced in the second direction (shown by arrow Y2 in FIG. 4).

The fourth beam member 62 has a tapered shape in which the width decreases from a fourth base portion 62*a* to a distal end 62*b*. A fourth base side hinge portion 81 is formed between the fourth base portion 62*a* and the second frame portion 30*b*. On both sides of the fourth base side hinge portion 81, a pair of element accommodation portions 82 and 83 consisting of a recess are formed. A fourth head side hinge portion 84 having a narrowed width is provided between the distal end 62*b* of the fourth beam member 62 and the second portion 33*b* of the head supporting member 33. The first frame portion 30*a*, the first beam member 31, and the third beam member 61 may be formed of an integral metal plate. In addition, the second frame portion 30*b*, the second beam member 32, and the fourth beam member 62 may be formed of an integral metal plate.

The element accommodation portions 82 and 83 are formed between the second frame portion 30*b* and the fourth beam member 62. The piezoelectric elements 67 and 68 are accommodated in the element accommodation portions 82 and 83, respectively. The piezoelectric element 67 indicated by the hatching in FIG. 4 is accommodated in the element accommodation portion 82. The piezoelectric element 67 is accommodated in the element accommodation portion 82 with a predetermined polarity so as to expand or contract based on the polarity of the applied voltage. The piezoelectric element 68 is accommodated in the element accommodation portion 83 such that it faces the opposite direction of the piezoelectric element 67 thereby having the opposite polarity of the piezoelectric element 67.

The piezoelectric elements 67 and 68 provided on the fourth beam member 62 constitute a fourth piezoelectric unit PZ4. When the piezoelectric element 67 contracts by the application of a voltage and the piezoelectric element 68 expands, the distal end 62*b* of the fourth beam member 62 is displaced in the first direction (shown by arrow Y1 in FIG. 4). When the piezoelectric element 67 expands by the application of a voltage and the piezoelectric element 68 contracts, the distal end 62*b* of the fourth beam member 62 is displaced in the second direction (shown by arrow Y2 in FIG. 4).

The second portion 33*b* of the head supporting member 33 moves in a direction along the surface of the tape 7 (first direction Y1 or second direction Y2) by the fourth beam member 62 displacing the same direction as that of the third beam member 61 in this manner. Each of the first direction Y1 and the second direction Y2 is the tape track direction.

For example, when all of the piezoelectric elements 35 to 38 and 65 to 68 are applied with input voltages [+y], the piezoelectric elements 36, 38, 66, and 68 in the normal positions expand and the piezoelectric elements 35, 37, 65, and 67 in a reverse position contract. Thus, the head member 9 moves in the first direction (shown by arrow Y1).

When all of the piezoelectric elements 35 to 38 and 65 to 68 are applied with input voltages [−y], the piezoelectric elements 36, 38, 66, and 68 in the normal positions contract and the piezoelectric elements 35, 37, 65, and 67 in a reverse position expand. By this structure, the head member 9 moves in the second direction (the opposite direction of arrow Y1). Thus, it is possible to move the head member 9 in the Y-axial direction using an input signal [+y] of one system.

Similarly to the first beam member 31 shown in FIG. 5, the third beam member 61 is bent with respect to the head supporting member 33 at an angle θ1 (for example, 30°). Similarly to the second beam member 32 shown in FIG. 5, the fourth beam member 62 is bent with respect to the head supporting member 33 at an angle θ2 (for example, 30°).

A reinforcement member 90 is provided between the head supporting member 33 and the base member 17. The reinforcement member 90 includes a first member 90*a* and a second member 90*b*. The first member 90*a* is arranged in the vicinity of the first end portion 9*a* of the head member 9. The second member 90*b* is arranged in the vicinity of the second end portion 9*b* of the head member 9. The first member 90*a* is arranged between the first portion 33*a* of the head supporting member 33 and the base member 17. That is, an end of the first member 90*a* is connected to the first portion 33*a* of the head supporting member 33. The other end of the first member 90*a* is connected to the base member 17 by a fixing portion 93.

The second member 90*b* of the reinforcement member 90 is arranged between the second portion 33*b* of the head supporting member 33 and the base member 17. That is, an end of the second member 90*b* is connected to the second portion 33*b* of the head supporting member 33. The other end of the second member 90*b* is connected to the base member 17 by a fixing portion 94.

As described above, the reinforcement member 90 of the first embodiment includes the first member 90*a* and the second member 90*b*. The first member 90*a* is arranged between the first end portion 9*a* of the head member 9 and the base member 17. The second member 90*b* is arranged between the second end portion 9*b* of the head member 9 and the base member 17. The reinforcement member 90 prevents the head supporting member 33 from displacing in the thickness direction (Z-axial direction) of the head member 9. The reinforcement member 90 allows the head supporting member 33 to move in the direction along the surface of the tape 7 (Y-axial direction).

Figure 6:
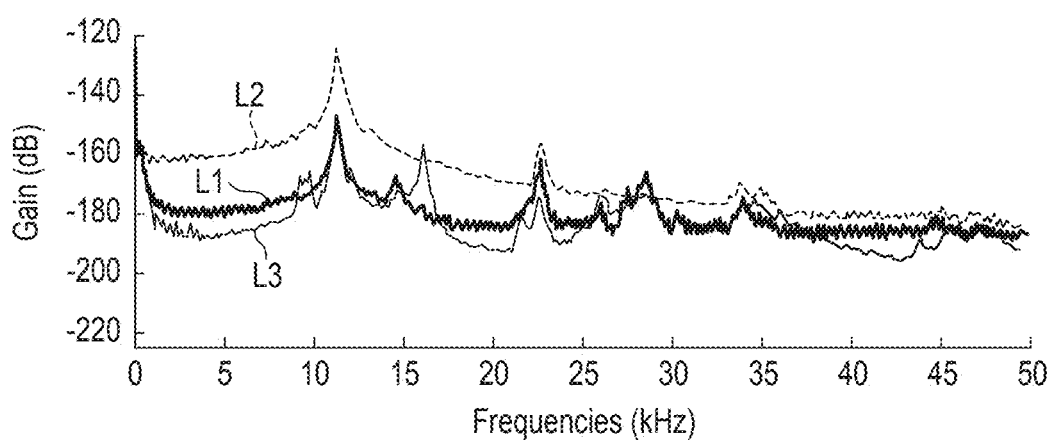
FIG. 6 is a diagram showing a vibration property of the head driving device of the first embodiment.

FIG. 6 shows a vibration property in a case where the head driving device 10A including the reinforcement member 90 is vibrated. The head member 9 is vibrated by the piezoelectric units PZ1, PZ2, PZ3, and PZ4 of the head driving device 10A, and then, vibration modes are measured. A vibration frequency is from 0 kHz to 50 kHz. In FIG. 6, the solid line L1 indicates a vibration property in the X-axial direction, the broken line L2 indicates a vibration property in the Y-axial direction, and the thin line L3 indicates a vibration property in the Z-axial direction.

Figure 7:
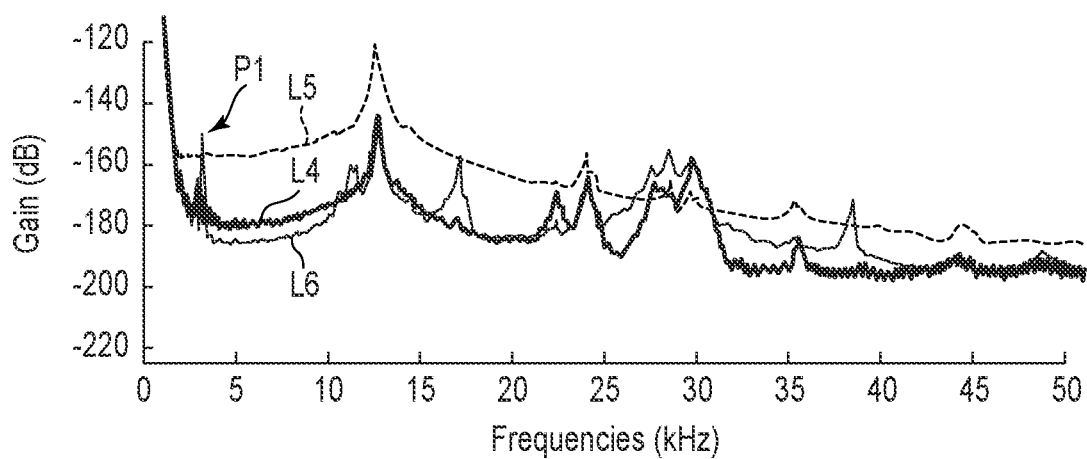
FIG. 7 is a diagram showing a vibration property of a head driving device of a comparative example 1.

FIG. 7 shows a vibration property in a case where the head driving device of the comparative example 1, which does not include the reinforcement member 90, is vibrated. A vibration frequency is from 0 kHz to 50 KHz. In FIG. 7, the solid line L4 indicates a vibration property in the X-axial direction, the broken line L5 indicates a vibration property in the Y-axial direction, and the thin line L6 indicates a vibration property in the Z-axial direction. The vibration property of the comparative example 1 (FIG. 7) shows a large peak P1 of the vibration mode, especially large in the Z-axial direction (in the thickness direction of the head member) in the low frequency range (around 2 kHz).

In contrast, as to the vibration property of the head driving device 10A of the present embodiment shown in FIG. 6, the vibration mode in the Z-axial direction is suppressed at lower state in the low frequency range (around 2 kHz). In the head driving device 10A of the present embodiment, the vibration property of the head member 9 has been improved such as having the effect of suppressing the rolling of the head member 9 (rotation around the Y axis).

Figure 8:
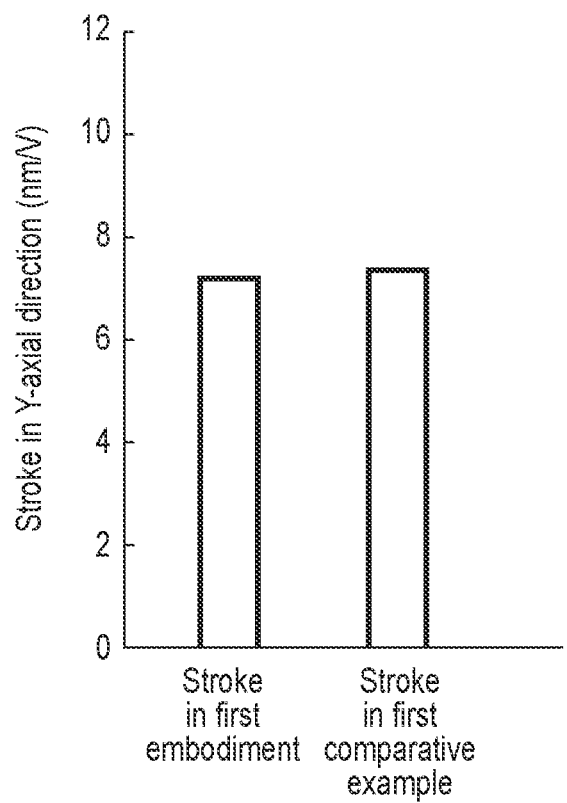
FIG. 8 is a diagram showing a stroke in a case where the head driving device of the first embodiment is vibrated and a stroke in a case where the head driving device of the comparative example 1 is vibrated.

FIG. 8 shows a stroke of the head member 9 in the Y-axial direction in a case where the head driving device 10A is vibrated, and a stroke of a head member in the Y-axial direction in a case where the head driving device of the comparative example 1 is vibrated. The head driving device 10A comprising the reinforcement member 90 can produce a stroke equivalent to a stroke of the head driving device, which does not comprise a reinforcement member, in the comparative example 1.

Figure 9:
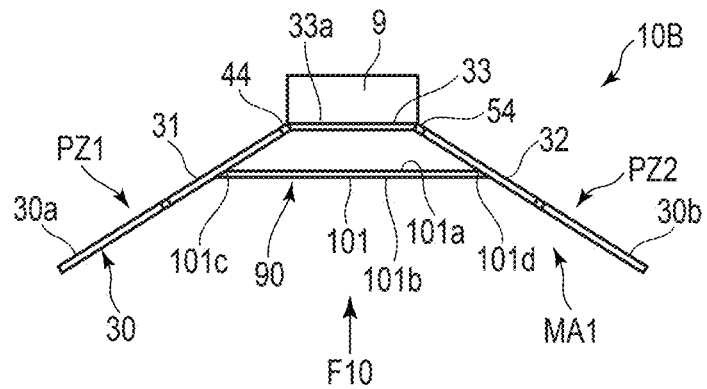
FIG. 9 is a front view of a head driving device of a second embodiment.
Figure 10:
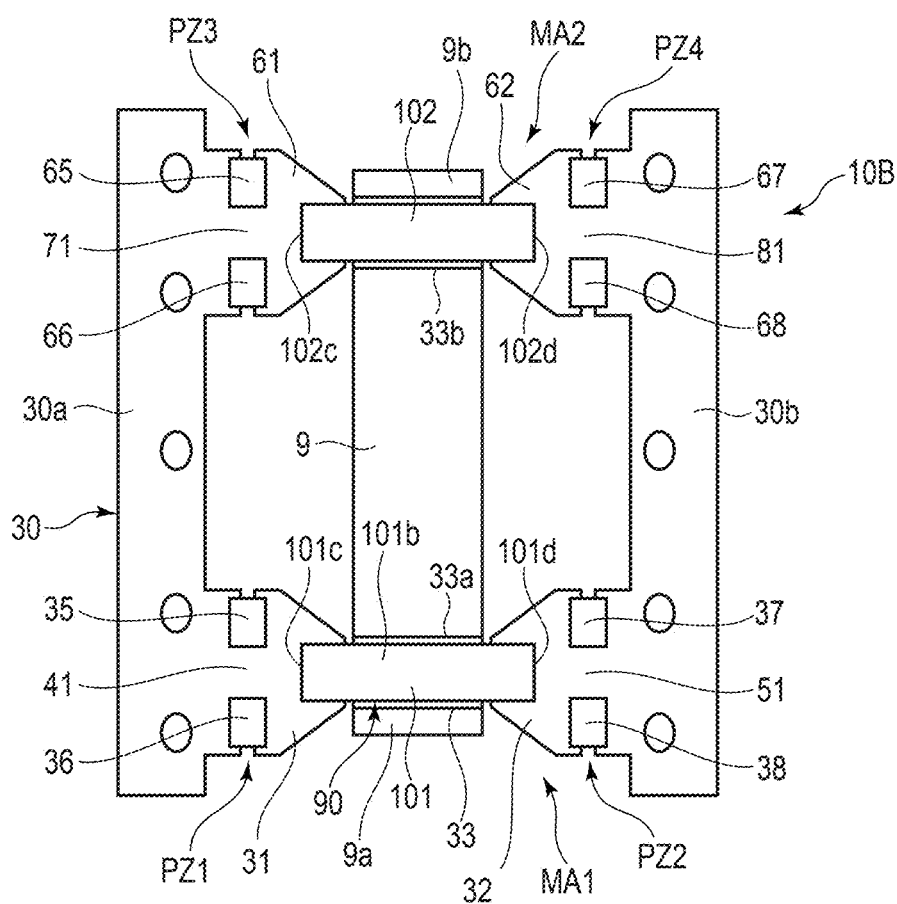
FIG. 10 is a bottom view in which the head driving device shown in FIG. 9 is viewed in the direction shown by arrow F10 in FIG. 9.
Figure 11:
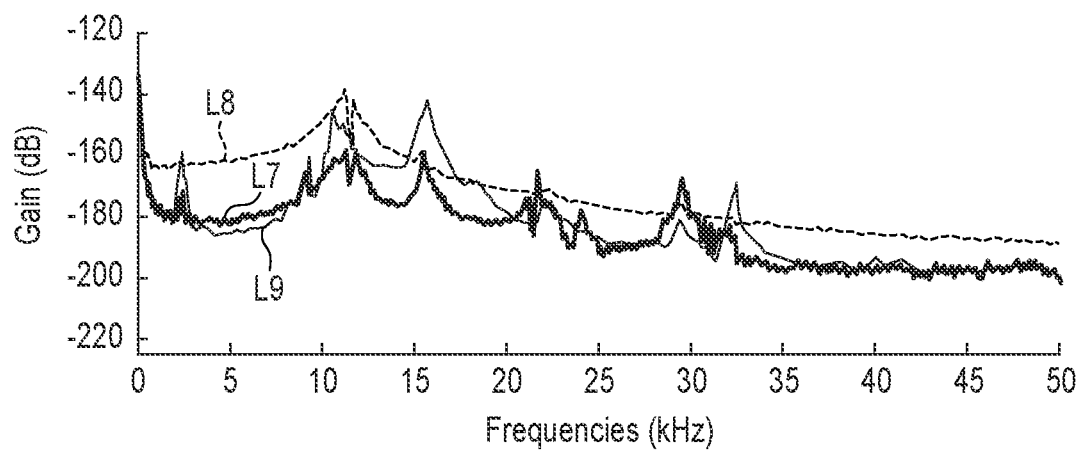
FIG. 11 is a diagram showing a vibration property of the head driving device of the second embodiment.

[Second Embodiment] (FIG. 9 to FIG. 11)

FIG. 9 shows a head driving device 10B of a second embodiment. FIG. 10 is a bottom view in which the head driving device 10B is viewed in the direction shown by arrow F10 in FIG. 9. The head driving device 10B of the second embodiment is different from the head driving device 10A of the first embodiment in a form of a reinforcement member 90. Since the other structures are common to the head driving device 10A of the first embodiment and the head driving device 10B, explanations thereof are omitted by adding common reference numbers to common structural elements.

As shown in FIG. 9 and FIG. 10, the reinforcement member 90 of the head driving device 10B includes a first plate 101 and a second plate 102. The first plate 101 is provided on a first actuator assembly MA1. The second plate 102 is provided on a second actuator assembly MA2. The first plate 101 is arranged between a first beam member 31 and a second beam member 32.

The first plate 101 is laterally (horizontally) arranged along a first portion 33a of a head supporting member 33. The first plate 101 has a first surface 101a and a second surface 101b. The first surface 101a faces the first portion 33a of the head supporting member 33. The second surface 101b is on the opposite side of the first surface 101a. The first plate 101 includes a first end portion 101c connected to the first beam member 31 and a second end portion 101d connected to the second beam member 32.

The second plate 102 is laterally (horizontally) arranged along a second portion 33b of the head supporting member 33. That is, similarly to the first plate 101, the second plate 102 has a first surface facing the head supporting member 33 and a second surface on the opposite side of the first surface. The second plate 102 includes a first end portion 102c connected to a third beam member 61 and a second end portion 102d connected to a fourth beam member 62.

The reinforcement member 90 formed of the first plate 101 and the second plate 102 allows the head supporting member 33 to move in the direction along the surface of the tape 7 (Y-axial direction) and controls the head supporting member 33 from displacing in the thickness direction (Z-axial direction) and the like of a head member 9.

FIG. 11 shows a vibration property in a case where the head driving device 10B including the reinforcement member 90 is vibrated. The head member 9 is vibrated by piezoelectric units PZ1, PZ2, PZ3, and PZ4 of the head driving device 10B, and then, vibration modes are measured. A vibration frequency is from 0 kHz to 50 kHz. In FIG. 11, the solid line L7 indicates a vibration property in the X-axial direction, the broken line L8 indicates a vibration property in the Y-axial direction, and the thin line L9 indicates a vibration property in the Z-axial direction.

Figure 12:
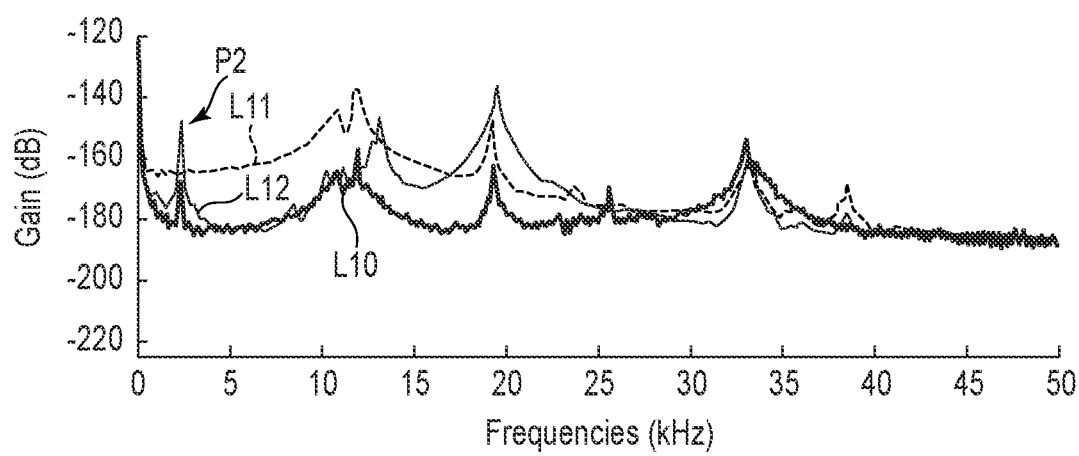
FIG. 12 is a diagram showing a vibration property of a head driving device of a comparative example 2.

FIG. 12 shows a vibration property in a case where the head driving device of the comparative example 2, which does not include the reinforcement member 90, is vibrated. A vibration frequency is from 0 kHz to 50 kHz. In FIG. 12, the solid line L10 indicates a vibration property in the X-axial direction, the broken line L11 indicates a vibration property in the Y-axial direction, and the thin line L12 indicates a vibration property in the Z-axial direction. The vibration property of the comparative example 2 (FIG. 12) shows a large peak P2 of the vibration mode in the low frequency range (around 2 kHz), especially in the Z axial direction (in the thickness direction of the head member).

In contrast, as to the vibration property of the head driving device 10B shown in FIG. 11, the vibration mode in the Z-axial direction is suppressed at lower state in the low frequency range (around 2 kHz). In the head driving device 10B of the present embodiment, the vibration property of the head member 9 has been improved such as having the effect of suppressing the rolling of the head member 9 (rotation around the Y axis).

FIG. 13 shows a stroke of the head member 9 in the Y-axial direction in a case where the head driving device 10B is vibrated, and a stroke of the head member 9 in the Y-axial direction in a case where the head driving device of the comparative example 2 is vibrated. The head driving device 10B comprising the reinforcement member 90 can produce a stroke equivalent to a stroke of the head driving device, which does not comprise a reinforcement member, in the comparative example 2.

Figure 14:
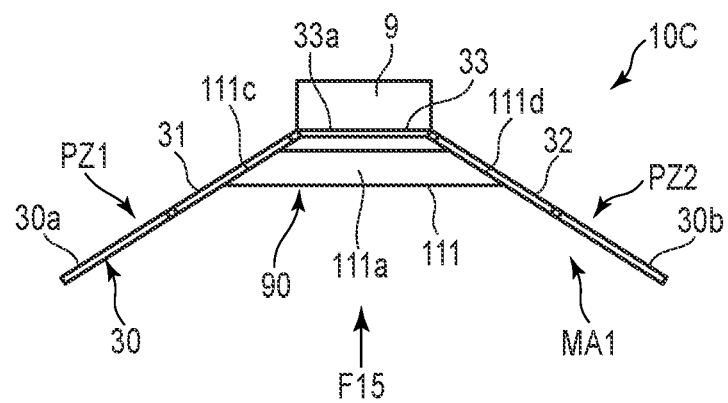
FIG. 14 is a front view of a head driving device of a third embodiment.
Figure 15:
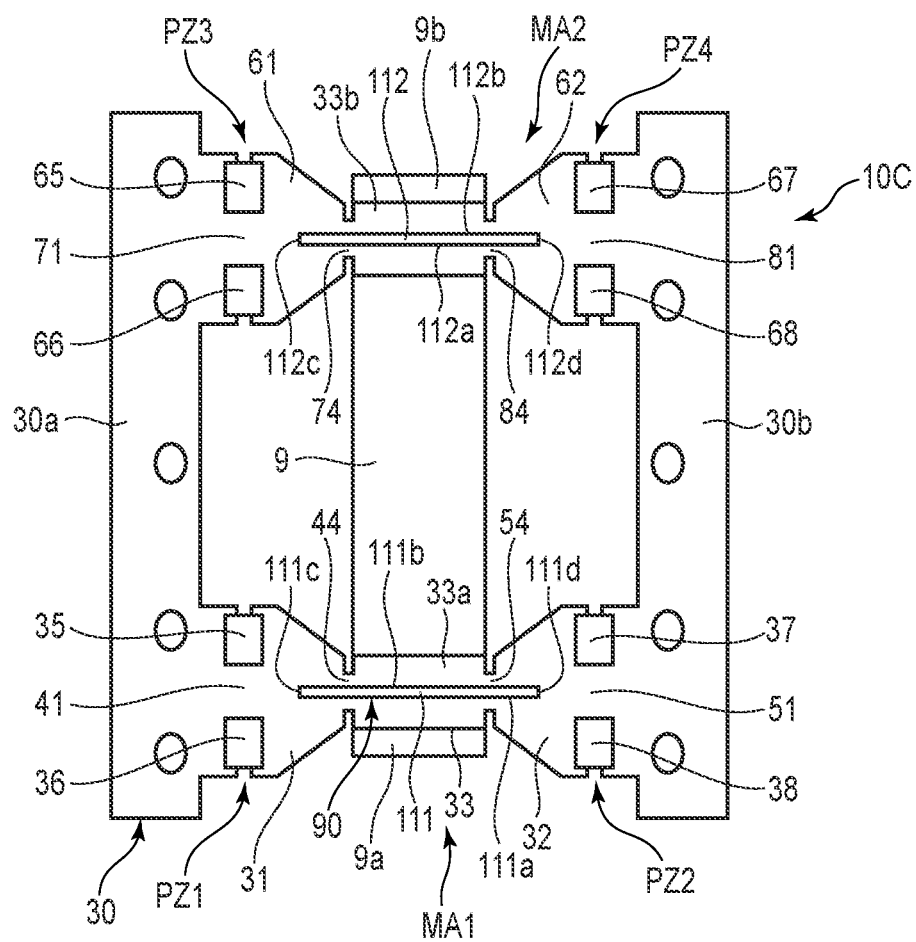
FIG. 15 is a bottom view in which the head driving device shown in FIG. 14 is viewed in the direction shown by arrow F15 in FIG. 14.

[Third Embodiment] (FIG. 14 to FIG. 16)

FIG. 14 shows a head driving device 10C of a third embodiment. FIG. 15 is a bottom view in which the head driving device 10C is viewed in the direction shown by arrow F15 in FIG. 14. The head driving device 10C of the third embodiment is different from the head driving device 10B of the second embodiment in a form of a reinforcement member 90. Since the other structures are common to the head driving device 10B of the second embodiment and the head driving device 10C, explanations thereof are omitted by adding common reference numbers to common structural elements.

As shown in FIG. 14 and FIG. 15, the reinforcement member 90 of the head driving device 10C of the third embodiment includes a first plate 111 and a second plate 112. The first plate 111 is provided on a first actuator assembly MA1. The second plate 112 is provided on a second actuator assembly MA2. The first plate 111 is arranged between a first beam member 31 and a second beam member 32.

The first plate 111 is arranged in a direction orthogonal (vertical) to a first portion 33a of a head supporting member 33. The first plate 111 has a first surface 111a and a second surface 111b. The first surface 111a is perpendicular to the first portion 33a of the head supporting member 33. The second surface 111b is on the opposite side of the first surface 111a. The first surface 111a and the second surface 111b are parallel to each other. The first plate 111 includes a first end portion 111c and a second end portion 111d. The first end portion 111c is connected to the first beam member 31. The second end portion 111d is connected to a second beam member 32.

The second plate 112 is arranged in a direction orthogonal (vertical) to a second portion 33b of the head supporting member 33. The second plate 112 has a first surface 112a and a second surface 112b. The first surface 112a is vertical to the second portion 33b of the head supporting member 33. The second surface 112b is on the opposite side of the first surface 112a. The first surface 112a and the second surface 112b are parallel to each other. The second plate 112 includes a first end portion 112c connected to a third beam member 61 and a second end portion 112d connected to a fourth beam member 62.

The reinforcement member 90 is constituted by the first plate 111 and the second plate 112. The reinforcement member 90 allows the head supporting member 33 to move in the direction along a surface of tape 7 (Y-axial direction) and controls the head supporting member 33 from displacing in the thickness direction (Z-axial direction) and the like of a head member 9.

FIG. 16 shows a vibration property in a case where the head driving device 10C including the reinforcement member 90 is vibrated. The head member 9 is vibrated by piezoelectric units PZ1, PZ2, PZ3, and PZ4 of the head driving device 10C, and then, vibration modes are measured. A vibration frequency is from 0 kHz to 50 KHz. In FIG. 16, the solid line L13 indicates a vibration property in the X-axial direction, the broken line L14 indicates a vibration property in the Y-axial direction, and the thin line L15 indicates a vibration property in the Z-axial direction.

FIG. 17 shows a vibration property in a case where the head driving device of the comparative example 3, which does not include the reinforcement member 90, is vibrated. A vibration frequency is from 0 kHz to 50 kHz. In FIG. 17, the solid line L16 indicates a vibration property in the X-axial direction, the broken line L17 indicates a vibration property in the Y-axial direction, and the thin line L18 indicates a vibration property in the Z-axial direction. The vibration property of the comparative example 3 (FIG. 17) shows a large peak P3 of the vibration mode in the low frequency range (around 2 kHz), especially in the Z axial direction (in the thickness direction of the head member).

In contrast, as to the vibration property of the head driving device 10C shown in FIG. 16, the vibration mode in the Z-axial direction is suppressed at low in the low frequency range (around 2 kHz). In the head driving device 10C of the present embodiment, the vibration property of the head member 9 has been improved such as having the effect of suppressing the rolling of the head member 9 (rotation around the Y axis).

FIG. 18 shows a stroke of the head member 9 in the Y-axial direction in a case where the head driving device 10C is vibrated, and a stroke of the head member in the Y-axial direction in a case where the head driving device of the comparative example 3 is vibrated. Although the stroke of the head driving device 10C comprising the reinforcement member 90 is smaller than a stroke of the head driving device, which does not include a reinforcement member, in the comparative example 3, the head driving device 10C can produce the stroke that does not involve a practical issue.

[Fourth Embodiment] (FIG. 19 to FIG. 20)

FIG. 19 shows a head driving device 10D of a fourth embodiment. FIG. 20 is a developed plan view showing a first beam member 31 and a second beam member 32 of the head driving device 10D. The head driving device 10D is different from the head driving device 10A of the first embodiment in a form of a reinforcement member 90. Since the other structures are common to the head driving device 10A of the first embodiment and the head driving device 10D, explanations thereof are omitted by adding common reference numbers to common structural elements.

As shown in FIG. 19 and FIG. 20, the reinforcement member 90 of the head driving device 10D includes a first extending portion 121, a second extending portion 122, and a connection portion 123. The first extending portion 121 is formed of a part of a first beam member 31. The second extending portion 122 is formed of a part of a second beam member 32. The first extending portion 121 extends toward the second beam member 32 from a bending portion 121a. The second extending portion 122 extends toward the first beam member 31 from a bending portion 122a. The first extending portion 121 and the second extending portion 122 are connected to each other on the connection portion 123 by, for example, laser welding.

As shown in FIG. 20, a slit 125 and a slit 126 are formed on the first beam member 31 and the second beam member 32, respectively. The first extending portion 121 is formed by the inside part of the slit 125 being bended on the bending portion 121a. The second extending portion 122 is formed by the inside part of the slit 126 being bended the bending portion 122a. The first extending portion 121 and the second extending portion 122 are connected to each other on the connection portion 123.

Figure 21:
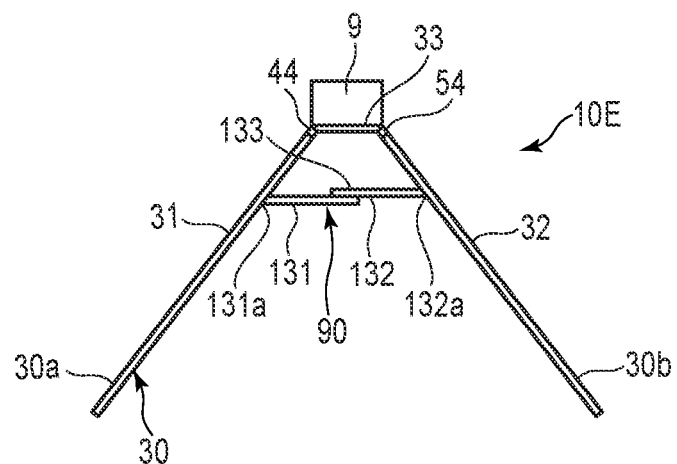
FIG. 21 is a front view of a head driving device of a fifth embodiment.
Figure 22:
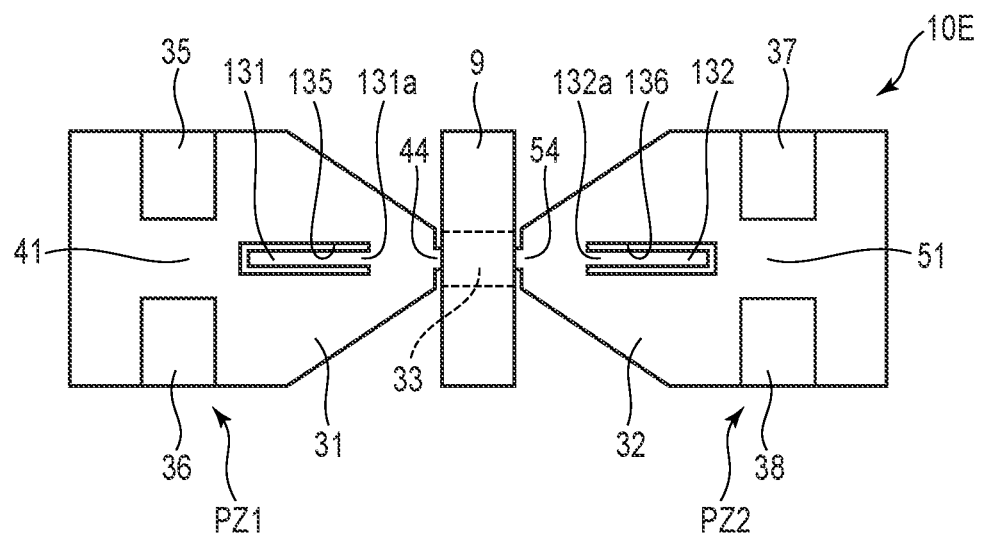
FIG. 22 is a developed plan view showing a first beam member and a second beam member of the head driving device shown in FIG. 21.

[Fifth Embodiment] (FIG. 21 to FIG. 22)

FIG. 21 shows a head driving device 10E of a fifth embodiment. FIG. 22 is a developed plan view showing a first beam member 31 and a second beam member 32 of the head driving device 10E. The head driving device 10E is different from the head driving device 10A of the first embodiment in a form of a reinforcement member 90. Since the other structures are common to the head driving device 10A of the first embodiment and the head driving device 10E, explanations thereof are omitted by adding common reference numbers to common structural elements.

As shown in FIG. 21 and FIG. 22, the reinforcement member 90 of the head driving device 10E includes a first extending portion 131, a second extending portion 132, and a connection portion 133. The first extending portion 131 is formed of a part of the first beam member 31. The second extending portion 132 is formed of a part of the second beam member 32. The first extending portion 131 extends toward the second beam member 32 from a bending portion 131a. The second extending portion 132 extends toward the first beam member 31 from a bending portion 132a. The first extending portion 131 and the second extending portion 132 are connected to each other on the connection portion 133 by, for example, laser welding.

As shown in FIG. 22, a U-shape slit 135 and a U-shape slit 136 are formed on the first beam member 31 and the second beam member 32, respectively. The first extending portion 131 is formed by the inside part of the slit 135 being bended on the bending portion 131a. The second extending portion 132 is formed by the inside part of the slit 136 being bended on the bending portion 132a. The first extending portion 131 and the second extending portion 132 are connected to each other on the connection portion 133.

Figure 23:
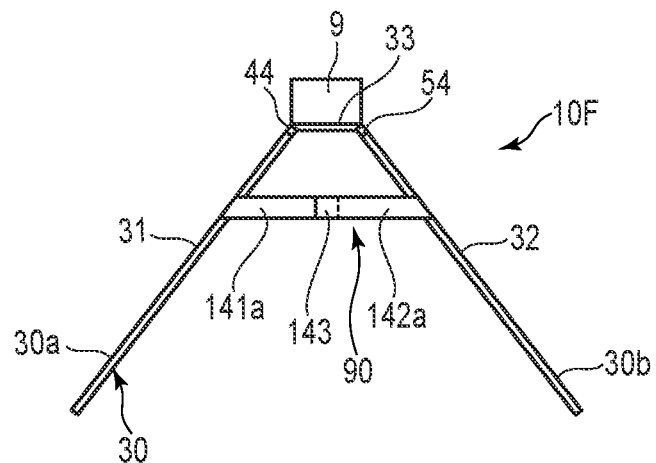
FIG. 23 is a front view of a head driving device of a sixth embodiment.
Figure 24:
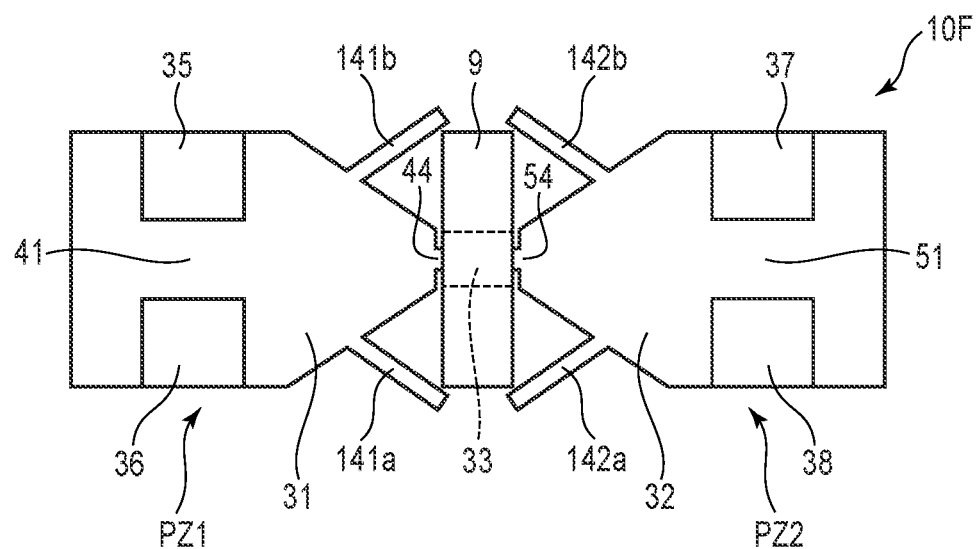
FIG. 24 is a developed plan view showing a first beam member and a second beam member of the head driving device shown in FIG. 23.

[Sixth Embodiment] (FIG. 23 to FIG. 24)

FIG. 23 shows a head driving device 10F of a sixth embodiment. FIG. 24 is a developed plan view showing a first beam member 31 and a second beam member 32 of the head driving device 10F. The head driving device 10F is different from the head driving device 10A of the first embodiment in a form of a reinforcement member 90. Since the other structures are common to the head driving device 10A of the first embodiment and the head driving device 10F, explanations thereof are omitted by adding common reference numbers to common structural elements.

As shown in FIG. 23 and FIG. 24, the reinforcement member 90 of the head driving device 10F includes a pair of first extending portions 141a and 141b and a pair of second extending portions 142a and 142b. The first extending portions 141a and 141b extend from both side portions of the first beam member 31. The second extending portions 142a and 142b extend from both side portions of the second beam member 32. As shown in FIG. 23, the first extending portion 141a and the second extending portion 142a are connected to each other on a connection portion 143 by, for example, laser welding or an adhesive. The first extending portion 141b and the second extending portion 142b also are connected to each other by the same connection portion 143.

[Seventh Embodiment] (FIG. 25)

FIG. 25 shows a head driving device 10G of a seventh embodiment. The head driving device 10G is different from the head driving device 10A of the first embodiment in a form of a reinforcement member 90. Since the other structures are common to the head driving device 10A of the first embodiment and the head driving device 10G, explanations thereof are omitted by adding common reference numbers to common structural elements.

As shown in FIG. 25, the reinforcement member 90 of the head driving device 10G includes a first extending portion 151, a second extending portion 152, a connection portion 153, and a damper portion 154. The first extending portion 151 is provided on a first beam member 31. The second extending portion 152 is provided on a second beam member 32. The damper member 154 is provided between the first extending portion 151 and the second extending portion 152 on the connection portion 153. The damper member 154 includes a viscoelastic material layer 155. The viscoelastic material layer 155 can reduce the vibration caused on the first beam member 31, the second beam member 32, and the like.

Figure 27:
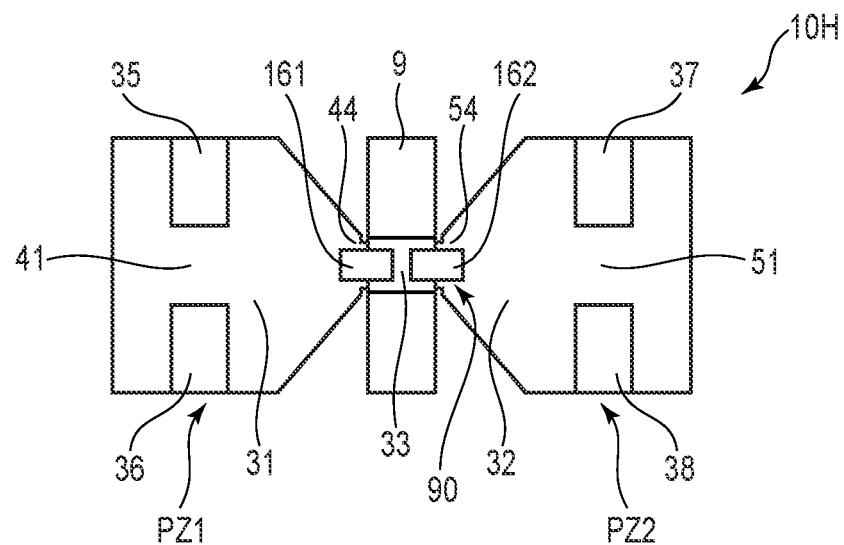
FIG. 27 is a bottom view in which the head driving device shown in FIG. 26 is viewed in the direction shown by arrow F27 in FIG. 26.

[Eighth Embodiment] (FIG. 26 to FIG. 27)

FIG. 26 shows a head driving device 10H of an eighth embodiment. FIG. 27 is a plan view of the head driving device 10H. The head driving device 10H is different from the head driving device 10A of the first embodiment in a form of a reinforcement member 90. Since the other structures are common to the head driving device 10A of the first embodiment and the head driving device 10H, explanations thereof are omitted by adding common reference numbers to common structural elements.

As shown in FIG. 26 and FIG. 27, the reinforcement member 90 of the head driving device 10H includes a first plate 161 laterally arranged and a second plate 162 laterally arranged. The first plate 161 is arranged between a first beam member 31 and a head supporting member 33. The second plate 162 is arranged between a second beam member 32 and the head supporting member 33. The first plate 161 and the second plate 162 are arranged laterally so as to be along the surface of the head supporting member 33. The first plate 161 and the second plate 162 restrain the vibration of the head supporting member 33 in the Z-axial direction and the like.

Figure 28:
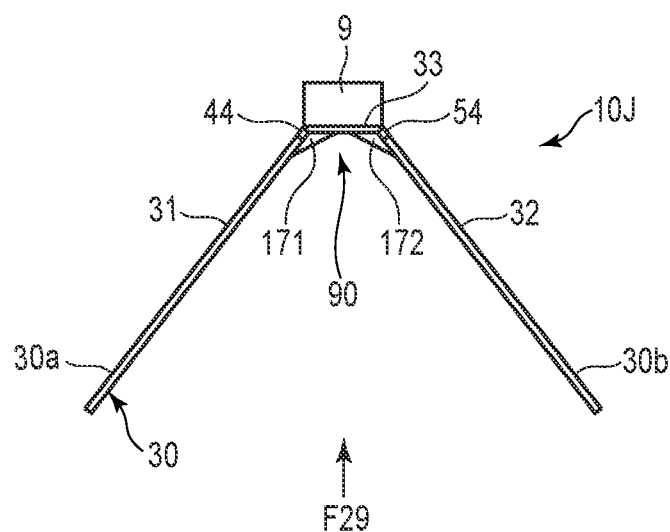
FIG. 28 is a front view of a head driving device of a ninth embodiment.
Figure 29:
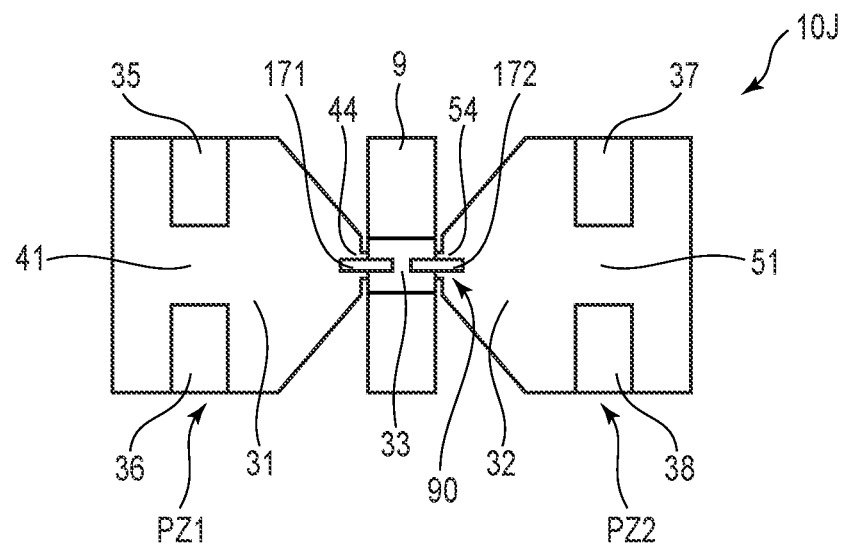
FIG. 29 is a bottom view in which the head driving device shown in FIG. 28 is viewed in the direction shown by arrow F29 in FIG. 28.

[Ninth Embodiment] (FIG. 28 to FIG. 29)

FIG. 28 shows a head driving device 10J of a ninth embodiment. FIG. 29 is a bottom view in which the head driving device 10J is viewed in the direction shown by arrow F29 in FIG. 28. The head driving device 10J is different from the head driving device 10A of the first embodiment in a form of a reinforcement member 90. Since the other structures are common to the head driving device 10A of the first embodiment and the head driving device 10J, explanations thereof are omitted by adding common reference numbers to common structural elements.

As shown in FIG. 28 and FIG. 29, the reinforcement member 90 of the head driving device 10J includes a first plate 171 arranged vertically and a second plate 172 arranged vertically. The first plate 171 is arranged between a first beam member 31 and a head supporting member 33. The second plate 172 is arranged between a second beam member 32 and the head supporting member 33. The first plate 171 and the second plate 172 are arranged in a direction orthogonal to the head supporting member 33. The first plate 171 and the second plate 172 restrain the vibration of the head supporting member 33 in the Z-axial direction and the like.

Figure 30:
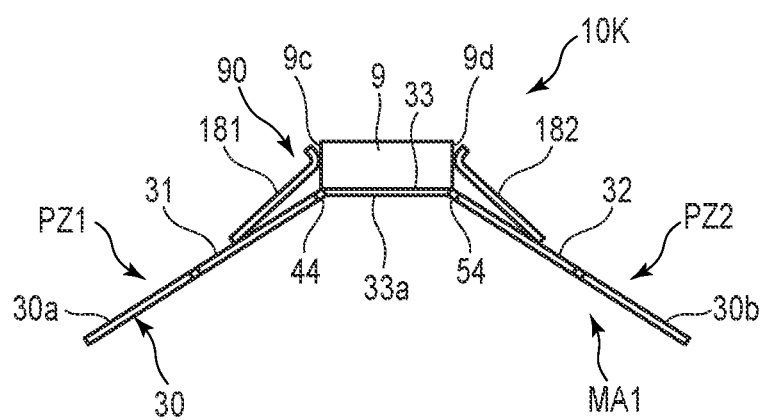
FIG. 30 is a front view of a head driving device of a tenth embodiment.
Figure 31:
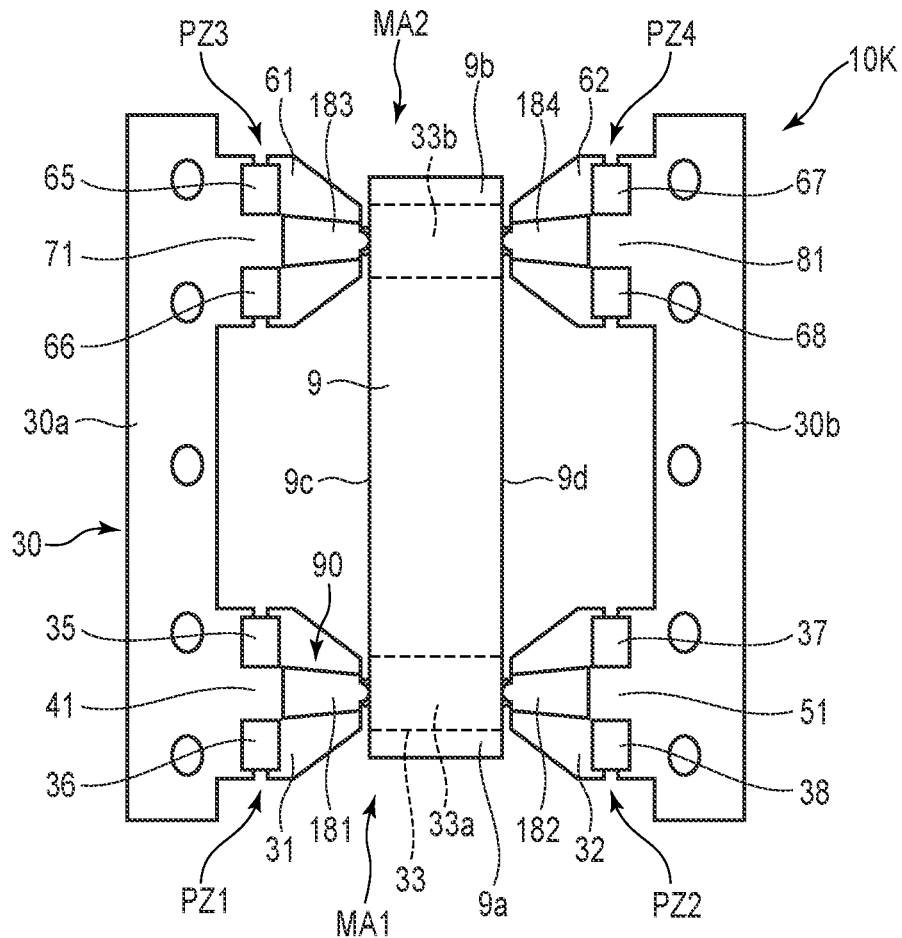
FIG. 31 is a plan view of the head driving device shown in FIG. 30.

[Tenth Embodiment] (FIG. 30 to FIG. 31)

FIG. 30 shows a head driving device 10K of a tenth embodiment. FIG. 31 is a plan view of the head driving device 10K. The head driving device 10K is different from the head driving device 10A of the first embodiment in a form of a reinforcement member 90. Since the other structures are common to the head driving device 10A of the first embodiment and the head driving device 10K, explanations thereof are omitted by adding common reference numbers to common structural elements.

As shown in FIG. 30 and FIG. 31, the reinforcement member 90 of the head driving device 10K includes a first plate 181 and a second plate 182. The first plate 181 is arranged between a first beam member 31 and a side surface 9c of a head member 9. The second plate 182 is arranged between a second beam member 32 and a side surface 9d of the head member 9. In addition, a third plate 183 is arranged between a third beam member 61 and the side surface 9c of the head member 9. A fourth plate 184 is arranged between a fourth beam member 62 and the side surface 9d of the head member 9. The first plate 181, the second plate 182, the third plate 183, and the fourth plate 184 restrain the vibration of the head supporting member 33 in the Z-axial direction and the like.

Figure 32:
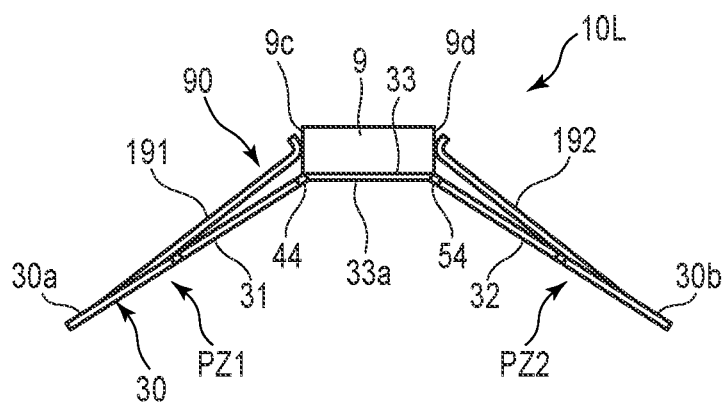
FIG. 32 is a front view of a head driving device of an eleventh embodiment.
Figure 33:
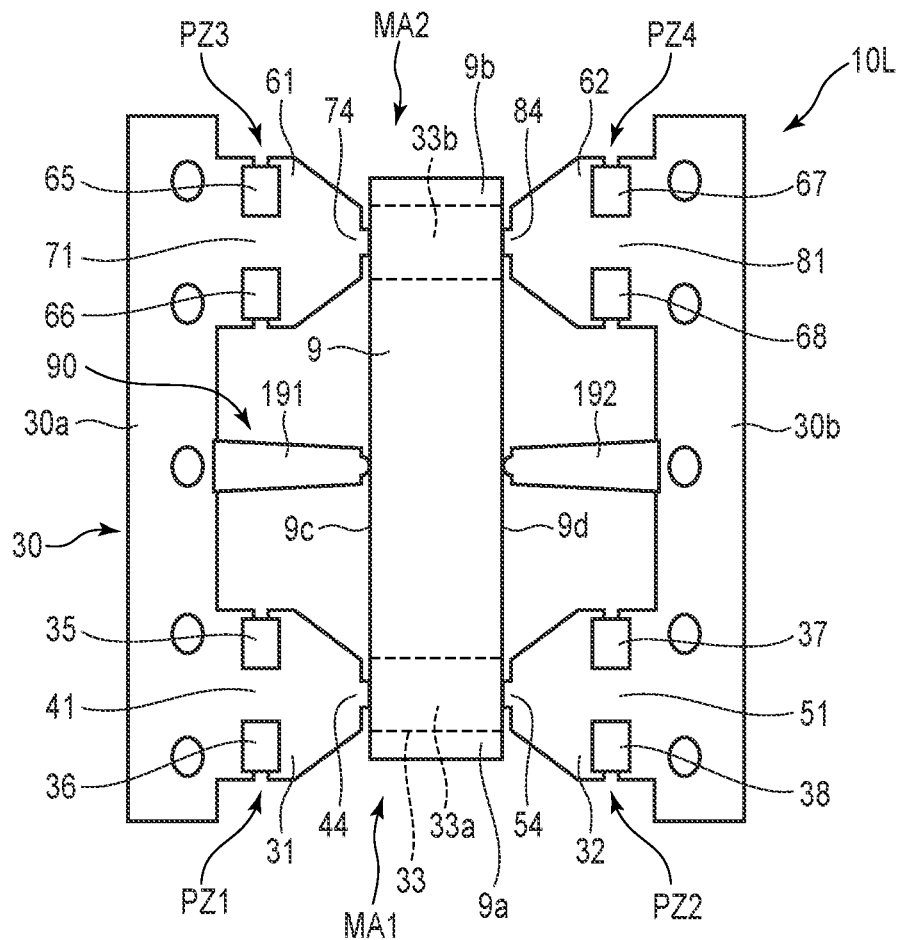
FIG. 33 is a plan view of the head driving device shown in FIG. 32.

[Eleventh Embodiment] (FIG. 32 to FIG. 33)

FIG. 32 shows a head driving device 10L of an eleventh embodiment. FIG. 33 is a plane view of the head driving device 10L. The head driving device 10L is different from the head driving device 10A of the first embodiment in a form of a reinforcement member 90. Since the other structures are common to the head driving device 10A of the first embodiment and the head driving device 10L, explanations thereof are omitted by adding common reference numbers to common structural elements.

As shown in FIG. 32 and FIG. 33, the reinforcement member 90 of the head driving device 10L includes a first plate 191 and a second plate 192. The first plate 191 is arranged between a first frame portion 30a of a frame structure 30 and a side surface 9c of a head member 9. The second plate 192 is arranged between a second frame portion 30b of the frame structure 30 and a side surface 9d of the head member 9. The first plate 191 and the second plate 192 restrain the vibration of the head supporting member 33 in the Z-axial direction and the like.

Figure 34:
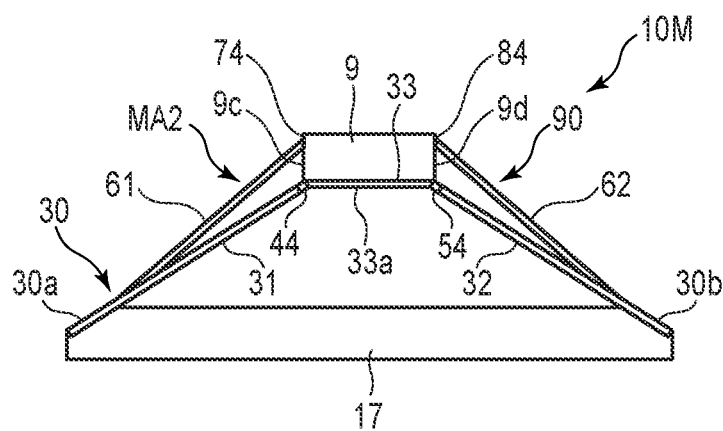
FIG. 34 is a front view of a head driving device of a twelfth embodiment.
Figure 35:
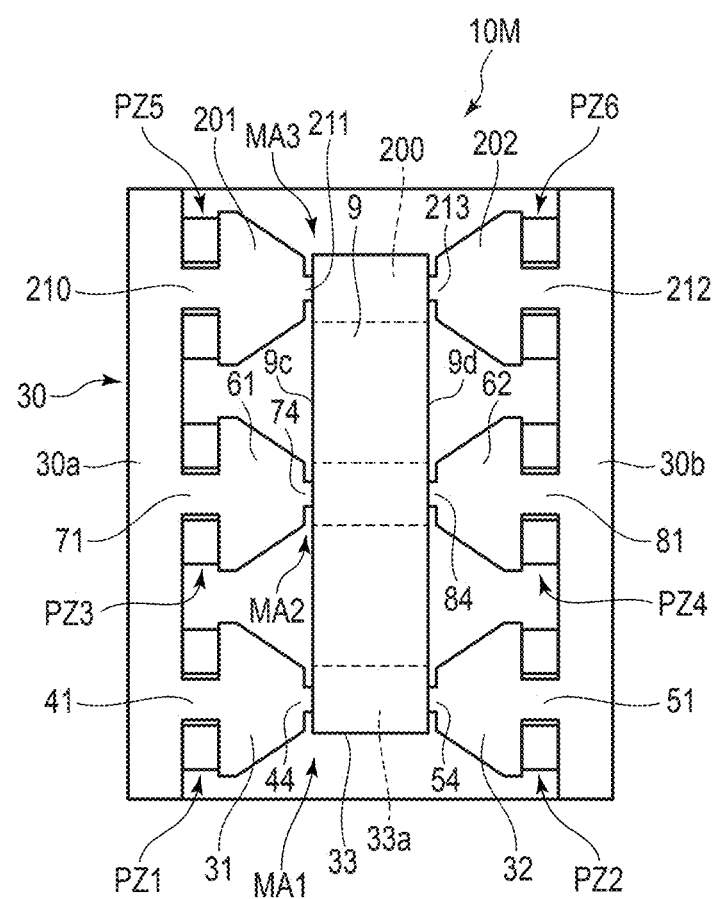
FIG. 35 is a plan view of the head driving device shown in FIG. 34.

[Twelfth Embodiment] (FIG. 34 to FIG. 35)

FIG. 34 shows a head driving device 10M of a twelfth embodiment. FIG. 35 is a plan view of the head driving device 10M. The head driving device 10M is different from the head driving device 10A of the first embodiment in comprising a third actuator assembly MA3. The third actuator assembly MA3 has the same configuration as those of the actuator assembly MA1 and MA2 of the head driving device 10A of the first embodiment shown in FIG. 4. Therefore, common reference numbers are added to structural elements common to the head driving device 10A of the first embodiment and the head driving device 10M of the twelfth embodiment, and explanations thereof are omitted.

The third actuator assembly MA3 includes a third portion 200 constituting a part of a head supporting member 33, a fifth beam member 201, a sixth beam member 202, a fifth piezoelectric unit PZ5, and a sixth piezoelectric unit PZ6. The third actuator assembly MA3 further includes a fifth base side hinge portion 210, a fifth head side hinge portion 211, a sixth base side hinge portion 212, and a sixth head side hinge portion 213.

As shown in FIG. 34 and FIG. 35, each of a first head side hinge portion 44 and the fifth head side hinge portion 211 is connected to the head supporting member 33. A third head side hinge portion 74 is connected to a side surface 9c of a head member 9. Thus, the height from a base member 17 to the third head side hinge portion 74 is different from the height of the first head side hinge portion 44 and the height of the fifth head side hinge portion 211. Therefore, a third beam member 61 can function as a reinforcement member 90.

As shown in FIG. 34 and FIG. 35, each of a second head side hinge portion 54 and the sixth head side hinge portion 213 is connected to the head supporting member 33. In addition, a fourth head side hinge portion 84 is connected to a side surface 9d of the head member 9. Thus, the height from the base member 17 to the fourth head side hinge portion 84 is different from the height of the second head side hinge portion 54 and the height of the sixth head side hinge portion 213. Therefore, the fourth beam member 62 can function as the reinforcement member 90.

(Note 1)

A head driving device based on a first aspect comprises the following configuration described in the first embodiment:
  a base member including a first frame portion and a second frame portion;
  a head supporting member supporting the head member;
  a first beam member arranged between the first frame portion and the head supporting member and including a first base portion connected to the first frame portion and a first head side hinge portion connected to the head supporting member;
  a second beam member arranged on a side opposite to the first beam member with the head supporting member interposed therebetween, the second beam member including a second base portion connected to the second frame portion and a second head side hinge portion connected to the head supporting member;
  a first piezoelectric unit arranged on the first beam member and comprising piezoelectric elements moving the head supporting member in a direction along a surface of the tape when being applied with a voltage;
  a second piezoelectric unit arranged on the second beam member and comprising piezoelectric elements moving the head supporting member in the direction along the surface of the tape when being applied with a voltage; and
  a reinforcement member including a first member and a second member, the first member arranged between a first end portion in a length direction of the head member and the base member, and the second member arranged between an end portion in a length direction of the head member and the base member.

(Note 2)

A head driving device based on a second aspect comprises the following configuration described in the second embodiment to the seventh embodiment:
  a base member including a first frame portion and a second frame portion;
  a head supporting member supporting a head member;
  a first beam member arranged between the first frame portion and the head supporting member and including a first base portion connected to the first frame portion and a first head side hinge portion connected to the head supporting member;
  a second beam member arranged on a side opposite to the first beam member with the head supporting member interposed therebetween, the second beam member including a second base portion connected to the second frame portion and a second head side hinge portion connected to the head supporting member;
  a first piezoelectric unit arranged on the first beam member and comprising piezoelectric elements moving the head supporting member in a direction along a surface of the tape when being applied with a voltage;
  a second piezoelectric unit arranged on the second beam member and comprising piezoelectric elements moving the head supporting member in the direction along the surface of the tape when being applied with a voltage; and
  a reinforcement member including a first member and a second member, the first member arranged between a first end portion in a length direction of the head member and the base member, and the second member arranged between a second end portion in a length direction of the head member and the base member.

When the present invention is implemented, the specific mode of each of the elements constituting each head driving device can be modified in various ways. For example, the number of actuator assembly can be one or three or more. In addition, a data storage device comes in various forms as needed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A head driving device configured to move a head member relative to tape as a recording medium, the head driving device comprising:
   a base member including a first frame portion and a second frame portion;
   a head supporting member supporting the head member;
   a first beam member arranged between the first frame portion and the head supporting member and including a first base portion connected to the first frame portion and a first head side hinge portion connected to the head supporting member;
   a second beam member arranged on a side opposite to the first beam member with the head supporting member interposed therebetween, the second beam member including a second base portion connected to the second frame portion and a second head side hinge portion connected to the head supporting member;
   a first piezoelectric unit arranged on the first beam member and comprising piezoelectric elements configured to move the head supporting member in a direction along a surface of the tape when applied with a voltage;
   a second piezoelectric unit arranged on the second beam member and comprising piezoelectric elements configured to move the head supporting member in the direction along the surface of the tape when applied with a voltage; and
   a reinforcement member allowing the head supporting member to move in the direction along the surface and controlling the head supporting member from moving in a thickness direction of the head member.

2. The head driving device of claim 1, wherein
   the reinforcement member comprises a first member arranged between a first end portion in a length direction of the head member and the base member and a second member arranged between a second end portion in the length direction of the head member and the base member.

3. The head driving device of claim 1, wherein
   the reinforcement member is formed of a plate arranged between the first beam member and the second beam member, and
   the plate is arranged laterally along the head supporting member and includes a first end portion connected to the first beam member and a second end portion connected to the second beam member.

4. The head driving device of claim 1, wherein
   the reinforcement member is formed of a plate arranged between the first beam member and the second beam member, and
   the plate is arranged in a vertical direction orthogonal to the head supporting member and includes a first end portion connected to the first beam member and a second end portion connected to the second beam member.

5. The head driving device of claim 1, wherein
   the reinforcement member comprises a first extending portion extending from the first beam member toward the second beam member, a second extending portion extending from the second beam member toward the first beam member, and a connection portion connecting the first extending portion with the second extending portion.

6. The head driving device of claim 5, wherein
   the first extending portion is formed of a part of the first beam member, and
   the second extending portion is formed of a part of the second beam member.

7. The head driving device of claim 6, wherein
   the connection portion comprises a damper member arranged between the first extending portion and the second extending portion.

8. The head driving device of claim 1, further comprising:
   a third beam member arranged between the first frame portion and the head supporting member and including a third base portion connected to the first frame portion and a third head side hinge portion connected to the head supporting member;
   a fourth beam member arranged on a side opposite to the third beam member with the head supporting member interposed therebetween, the fourth beam member including a fourth base portion connected to the second frame portion and a fourth head side hinge portion connected to the head supporting member;
   a third piezoelectric unit arranged on the third beam member and comprising piezoelectric elements configured to move the head supporting member in the direction along the surface of the tape when applied with a voltage; and
   a fourth piezoelectric unit arranged in the fourth beam member and comprising piezoelectric elements configured to move the head supporting member in the direction along the surface of the tape when applied with a voltage.

9. The head driving device of claim 8, wherein
   the first frame portion, the first beam member, and the third beam member are formed of an integral metal plate, and
   the second frame portion, the second beam member, and the fourth beam member are formed of an integral metal plate.

* * * * *